United States Patent [19]
Thompson et al.

[11] Patent Number: 6,019,282
[45] Date of Patent: *Feb. 1, 2000

[54] SYSTEM AND METHOD FOR COMMINGLING ITEMS DESTINED FOR MULTIPLE PAYORS IN A SINGLE ELECTRONIC POCKET AND FINANCIAL INFRASTRUCTURE EMPLOYING THE SAME

[75] Inventors: Mitchell D. Thompson; Stanley M. Josephson; Francis L. Paulson, all of Dallas, Tex.

[73] Assignee: Carreker-Antinori, Inc., Dallas, Tex.

[*] Notice: This patent is subject to a terminal disclaimer.

[21] Appl. No.: 09/036,473

[22] Filed: Mar. 6, 1998

Related U.S. Application Data

[63] Continuation-in-part of application No. 08/584,890, Jan. 11, 1996, Pat. No. 5,783,808, which is a continuation-in-part of application No. 08/236,632, Apr. 29, 1994, abandoned, which is a continuation-in-part of application No. 08/023,364, Feb. 26, 1993, Pat. No. 5,412,190, which is a continuation-in-part of application No. 07/731,529, Jul. 17, 1991, Pat. No. 5,237,159.

[51] Int. Cl.[7] .................................................. G06F 17/60
[52] U.S. Cl. ............................. 235/379; 705/30; 705/45
[58] Field of Search .................................. 235/379, 385; 705/42, 45, 30

[56] References Cited

U.S. PATENT DOCUMENTS

| | | | |
|---|---|---|---|
| 4,264,808 | 4/1981 | Owens et al. | 235/379 |
| 4,270,042 | 5/1981 | Case | 235/379 |
| 4,823,264 | 4/1989 | Deming | 235/379 |
| 4,949,174 | 8/1990 | Thomson et al. | 283/38 |
| 5,265,007 | 11/1993 | Barnhard, Jr. et al. | 235/379 |
| 5,373,550 | 12/1994 | Campbell et al. | 705/30 |

Primary Examiner—Thien M. Le
Assistant Examiner—Daniel St. Cyr

[57] ABSTRACT

For use in a electronic presentment process wherein electronic items are transmitted from a presenting financial institution ("FI") through intermediaries to payor FIs, a system for, and method of, clearing electronic items drawn on the payor FIs and received by the presenting FI for payment and a financial infrastructure employing the system or the method. The method includes the steps of: (1) sorting the electronic items into pockets corresponding to the intermediaries, electronic items destined for multiple of the payor FIs through a particular intermediary being commingled in a single pocket and (2) electronically transmitting the pockets from the presenting FI to the particular intermediary, the particular intermediary capable of further sorting the electronic items thereby to allow multi-staged sorting of the electronic items as the electronic items proceed through the electronic presentment process.

30 Claims, 13 Drawing Sheets

SYSTEM AND METHOD FOR COMMINGLING ITEMS DESTINED FOR MULTIPLE PAYORS IN A SINGLE ELECTRONIC POCKET AND FINANCIAL INFRASTRUCTURE EMPLOYING THE SAME

CROSS-REFERENCE TO RELATED APPLICATION

This application is a continuation-in-part of application Ser. No. 08/584,890, filed on Jan. 11, 1996 now U.S. Pat. No. 5,783,808, for an "Improved Electronic Check Presentment System Having Item Level Reconciliation Capability," a continuation-in-part of application Ser. No. 08/236,632, filed on Apr. 29, 1994 now abandoned, for an "Improved Electronic Check Presentment System having a Non-ECP Exceptions Notification System Incorporated Therein," a continuation-in-part of application Ser. No. 08/023,364, filed on Feb. 26, 1993 now U.S. Pat. No. 5,412,190, for an "Electronic Check Presentment System Having a Return Item Notification System Incorporated Therein," a continuation-in-part of original application Ser. No. 07/731,529, filed on Jul. 17, 1991 now U.S. Pat. No. 5,237,159 for an "Electronic Check Presentment System." The foregoing are hereby incorporated herein by reference.

REFERENCE TO MICROFICHE APPENDIX

A microfiche appendix containing a computer program listing was submitted with the original application and is incorporated herein by reference.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyrights whatsoever.

TECHNICAL FIELD OF THE INVENTION

The present invention is directed, in general, to electronic check presentment and, more specifically, to electronic check presentment ("ECP") systems and methods wherein items destined for multiple payor financial institutions ("FIs") may be commingled in a single electronic "pocket" and a financial infrastructure employing the same.

BACKGROUND OF THE INVENTION

Historically, FIs, primarily comprising banks, have handled the transfer and presentment of items, often largely comprising checks, for payment in a manual, paper-based fashion. At specified times each day, "presenting" or "sending" FIs sort all checks presented to them from depositors and other correspondent FIs into bundles or "pockets," with the bundles containing checks for the particular FIs on which they are drawn ("payor" FIs). As the bundles of checks are sorted (or "pocketed") for particular payor FIs, they are segregated into batches of about 300 checks according to their American Banking Association ("ABA")-assigned routing/transit numbers ("R/Ts"). One or more of these batches are then aggregated for shipment to the payor FI. A detail listing of all checks within the batch and a cover letter (a "cash letter") are attached to each shipment of checks and summarize the contents of the batch. Such summary information comprises the name of the payor FI, the preassigned R/T associated with the name of the payor FI, the number of checks in the shipment and the total dollar amount of all of the checks in the batch. The presenting FI then transfers by means of physical transportation the cash letter and the bundles of checks to the payor FI.

When the payor FI receives the cash letter, it verifies that the contents of the cash letter, i.e., the check amounts, balance with the totals contained on the cover letter. After a check processing function and posting process, the payor FI determines whether the account on which each check is drawn is restricted in any way.

Accounts may be restricted for a variety of reasons. For instance, an account may be closed for cause, closed, dormant or new. The account holder may be deceased. The payor FI may order that no debits or transactions be posted or may order an officer restriction. There may be a lien on the account or the account holder may have placed a stop payment on file. Alternatively, the account may be restricted to a limited valid check number range or due to suspicious activity. In contrast with return of an item by reason of insufficient funds in an account, restrictions are placed on accounts regardless of the amount of any item presented.

Once the payor FI has determined that the account is not restricted, the payor FI determines whether enough money exists in the account on which the item is drawn to cover payment of the check (sufficient funds). Based on these determinations, the payor FI either accepts or rejects payment of the check, slating the check for return. The payor FI then notifies the presenting FI regarding any balancing discrepancies or any items that are to be returned. The return is accomplished by physical transportation of the returned check to the presenting FI that originally accepted the check.

A typical instance in which this paper-based presentment and routing process occurs is when, for example, an FI depositor receives a check from another party that is drawn on an FI other than the depositor's FI and the depositor presents the check to the depositor's own FI for payment, either in cash immediately or by crediting the depositor's account as a deposit. For the depositor's FI to collect on the check presented by the depositor, the depositor's FI (the presenting FI or "FI of first deposit") "presents" the check to the payor FI for deduction from the account of the drawer of the check. In this role, the presenting FI becomes the "presenting" FI. Once the payor FI receives and processes the check, it essentially pays the amount of the check to the presenting FI through a settlement process. In this role, the payor FI is legally referred to as the "payor" FI. Additionally, in terms of the delivery of items presented to the payor FI by a presenting FI for payment, the payor FI may be referred to as the "receiving" FI.

The procedure described above is an over-simplification of the process established for clearing checks between FIs. However, it is sufficient to demonstrate the problems associated with such a process. A first problem resulting from the above process is the delay between the time a check is first deposited at the presenting FI and the time the payor FI accepts or rejects the check. The presenting FI has the choice of either placing a hold on the depositor's FI account until it is notified of acceptance by the payor FI or it pays out the money to the presenting FI and incurs the risk that the check will be rejected by the payor FI as an unpaid check, perhaps because it is drawn on a restricted account.

Many FIs choose not to incur such a risk and therefore place a hold on the depositor's FI account until it is notified that the check has been accepted and paid, i.e., debited to the payor FI's account. However, the time that it takes for the presenting FI to be notified that a check has been accepted or rejected may take as long as 7 to 10 days. The Expedited Funds Availability Act of 1987, however, places limits on the length of time that an FI may retain a hold on a depositor's funds. In most cases, only two days are allowed for local items and only three days for non-local items. These time limits can severely expose an FI to risks of loss and fraud by forcing an FI accepting depositors' deposits to release funds to those depositors prior to verification that those funds are, in fact, collectable from the payor FI.

To overcome the problem of delay, FIs have attempted to automate the process of gathering checks into cash letters, sending and receiving cash letters and reconciling these cash letters against their contents. Such attempts at automation have included the installation of check sorter machines that scan checks at very high speeds and sort these checks into separate bundles associated with each payor FI. Conventional check processing methods employed by most U.S. FIs and other financial institutions now process checks and credits using high speed reader/sorter equipment such as IBM 3890's or Unisys DP1800's. The sorter "reads" information contained on the checks such as the R/T, the FI depositor's account number, the check serial number and the amount of the check. This information is contained in a line of symbols at the bottom of each check in Magnetic Ink Character Recognition ("MICR") form in a font called E13B. After reading and validation, the equipment transfers such information through data processing means to electronic data storage devices. Check sorter machines have been used quite successfully and are well known in the art.

Another attempt at automating the check process is the use of computer systems to record and manage the information associated with the check sorting procedure. Such computer systems interface with the check sorter machines and allow the computer systems to build database information associated with each check that is read. This allows an operator of a computer system to obtain information on checks that have been read such as the total number of checks drawn on specific FIs and the total dollars of all checks drawn on specific FIs. Such systems that accomplish this task are the IBM Check Processing Control System ("CPCS") and the Unisys Item Processing System ("IPS").

Although both of the above attempts have benefitted the industry, they have failed to address the problem of delays associated with both the transfer of cash letters between FIs and the notification of acceptance or non-payment of a check. Better transportation, overnight express and other services have helped to improve the physical transfer of cash letters, but the transfer of the information contained in the cash letters has still been dependent on the physical delivery of the cash letters to each of the payor FIs. Such dependence on the physical transfer of the cash letters perpetuates the delay associated with acceptance or non-payment of particular checks.

Ser. No. 08/236,632, filed on Apr. 29, 1994, entitled "Improved Electronic Check Presentment System Having a Non-ECP Exceptions Notification System Incorporated Therein," commonly assigned with the present invention and incorporated herein by reference is directed, in particular, to an improved electronic check processing system and data processing apparatus that incorporates a system for providing early electronic check return notifications arising from non-electronic check presentment exceptions. The system establishes an electronic version of the cash letter that precedes the paper version through the presentment process to the payor FI. If the payor FI "returns" an item, an electronic indication of that "return" is reflected back to the presenting FI, preferably prior to submission of the paper item to the paper-based presentment process. Thus, the system employs ECP to provide early warning to allow a presenting FI to avoid the subsequent paper-based presentment process and to institute defensive, preventive, remedial or corrective (together, "protective") action to prevent release of uncollected deposited funds to the depositor.

While the systems described above provide comprehensive "on-us" forward presentment processing capabilities to the ECP process, what is needed in the art is a corresponding transit component to provide a total ECP solution. More specifically, what is needed is a way of distributing the sorting process over more than one institution, allowing smaller presenting FIs to send their ECP work to a single receiver.

SUMMARY OF THE INVENTION

The present invention allows a presenting FI physically to sort multiple payor FI R/T transit items ("commingled") into a single, commingled pocket, rather than putting a single payor FI into one pocket at a time. Then, this single pocket of commingled electronic items can be transmitted from a collecting FI to a "Commingler" site which electronically pockets the items and selects an electronic endpoint. This electronic endpoint is normally an ECP-Receive capable institution.

To address the above-discussed deficiencies of the prior art, it is a primary object of the present invention to provide a way to distribute the sorting process throughout the electronic presentment process, such that items drawn on multiple payor FIs may be commingled.

In the attainment of the above primary object, the present invention provides, for use in an electronic presentment process wherein electronic items are transmitted from a presenting FI through intermediaries to payor FIs, a system for, and method of, clearing electronic items drawn on the payor FIs and received by the presenting FI for payment and a financial infrastructure employing the system or the method. The method includes the steps of: (1) sorting the electronic items into pockets corresponding to the intermediaries, electronic items destined for multiple of the payor FIs through a particular intermediary being commingled in a single pocket and (2) electronically transmitting the pockets from the presenting FI to the particular intermediary, the particular intermediary capable of further sorting the electronic items thereby to allow multi-staged sorting of the electronic items as the electronic items proceed through the electronic presentment process.

"Items" is defined for purposes of the present invention as including checks, deposits and other transactional units. "Items" may also include control data that allows extratransactional communication between FIs. "Intermediaries" are typically clearinghouses, but need not be so. "FIs" are typically banks, but can be any money-handling concern.

The present invention therefore recognizes that it is not necessary to perform a complete sort at the presenting FI. Instead, the presenting FI can sort according to the intermediaries with which it corresponds. Those intermediaries, in turn, can sort according to the intermediaries (or payor FIs) with which they correspond, and so forth, until the electronic items are ultimately sorted according to the payor FIs.

By reducing the number of transit pockets required for their sorter operation, FIs can show gains in operational productivity as well as open up more pockets for additional direct sends. Since more items can be transmitted to a Commingler location, the present invention also allows presenting FIs to extend their processing window to a later cut-off time. This permits them to hold open the processing window to handle additional customer deposits, leading to better float management and a higher level of customer service.

In one embodiment of the present invention, paper items accompany the electronic items through the electronic presentment process. This means that, if electronic items corresponding to multiple payor FIs are commingled in a single pocket destined for a particular intermediary, the corresponding paper items may likewise be commingled in a single pocket destined for the same intermediary. However, this certainly does not need to be the case. Alternatively, the paper items may be sorted according to their ultimate payor FI (as was always the case in the prior art) or may be commingled in a different manner to allow, for instance, the paper items to pass through a different intermediary.

The physical paper itself can either be sent to an ECP-Receive capable FI or to a different paper processor location separate from the receiver of the electronic items. A "routing summary" file (info) would be sent from the Commingler site to the paper processor to ensure proper routing of paper items to their appropriate destination. This info file may contain electronic item information and the electronic endpoint selected by the Commingler. This file would typically, but not necessarily, be in the same order as the incoming electronic items from the originating FI.

In one embodiment of the present invention, the method further comprises the step of appending to the electronic items a return notification eligibility flag to indicate whether a particular item, information about which forms a part of presentment information, is eligible for a return notification, the appending step being carried out prior to the electronically transmitting step.

In one embodiment of the present invention, the eligibility flag comprises an indication that a particular item is not eligible for a return notification.

In a related embodiment of the present invention, the eligibility flag comprises an indication that a particular electronic item requires at least one preliminary return notification and a final return notification. In an alternative embodiment of the present invention, the eligibility flag comprises an indication that a particular electronic item requires only a final return notification.

In one embodiment of the present invention, the method further comprises the step of comparing records of an exceptions file with records of a receive control file containing the electronic items, the exceptions file capable of containing records subject to both ECP and non-ECP exceptions to thereby produce an electronic file of the electronic items that are properly payable by a particular payor FI.

In one embodiment of the present invention, the method further comprises the step of producing a control totals and unmatched exceptions report by the step of comparing.

In one embodiment of the present invention, the method further comprises the step of providing an indication of stop payment suspect items to the presenting FI.

In one embodiment of the present invention, the method further comprises the step of providing an issue exceptions report to the presenting FI.

The present invention further provides, for use in an electronic presentment process wherein electronic items are transmitted from a presenting FI through intermediaries to payor FIs, a system for clearing electronic items drawn on the payor FIs and received by the presenting FI for payment, the system comprising: (1) an electronic sorter that sorts the electronic items into pockets corresponding to the intermediaries, electronic items destined for multiple of the payor FIs through a particular intermediary being commingled in a single pocket and (2) data communication circuitry that electronically transmits the pockets from the presenting FI to the particular intermediary, the particular intermediary capable of further sorting the electronic items thereby to allow multi-staged sorting of the electronic items as the electronic items proceed through the electronic presentment process.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
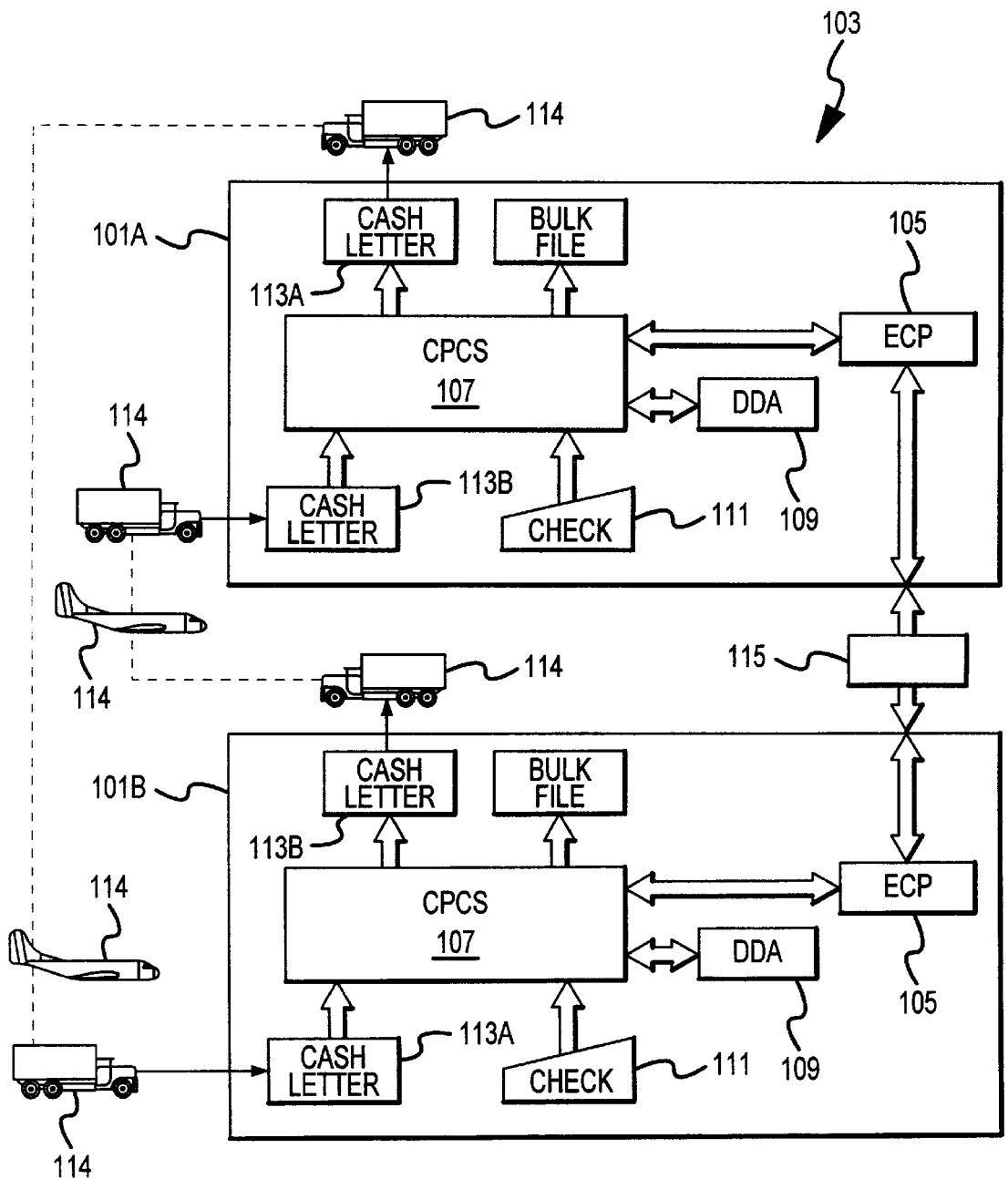
FIG. 1 is a schematic representation of the work flows within an electronic presentment process.

Referring initially to FIG. 1, partner FIs 101 participate in an Electronic Check Clearing House Organization ("ECCHO") exchange program 103. There is no limit on the number of FIs that may participate in these electronic exchanges. Typically, each partner FI in the exchange has a check capture system 107, such as the industry standard check processing control system ("CPCS") of International Business Machines Corporation or Unisys Corporation's item processing system ("IPS") and a Demand Deposit Account ("DDA") system 109. All are data processing systems having various configurations well known in the art. (For purposes of nomenclature, the check capture system 107 is referred to in the accompanying drawings and descriptions as the "CPCS"). Additionally, when participating in the electronic exchanges, each FI has an ECP system 105 that is interfaced to the CPCS 107. The ECP system 105 may run on the same data processing equipment or computer system as the CPCS 107 or the DDA 109. The CPCS 107, DDA 109 and ECP 105 systems are used as follows in an electronic presentment system.

Partner FIs 101A and 101B receive paper checks 111, usually deposited by their respective customers. After their deposit or cashing, the checks are "captured" by the CPCS 107, usually after the close of business on the day they are received. The capture process begins by passing the checks through check sorting machines (not shown). The sorters read characters on each paper check that are printed with magnetic ink and are provided to a magnetic ink character recognition ("MICR") system for conversion to data to be stored in a CPCS mass data storage file ("MDS") (not shown). The printed characters are sometimes collectively referred to as the MICR line and the complete set of MICR-line data is sometimes called a check "image" or "code line," as it contains most of the pertinent data on the check. The records in the CPCS MDS include fields for the R/T number of the payor FI (the FI on which the check is drawn), the account number of the customer who wrote the check, the serial number of the check and its amount. Based on the R/T number on the check, the CPCS 107 directs the sorter to pocket the check for the FI on which it is drawn.

At various times throughout each business day, the CPCS 107 generates a cash letter 113 for each FI for which there are checks. The checks that are pocketed for each FI are then bundled with the respective cash letter. Collectively, the checks and the letter are simply referred to as a cash letter 113. Assuming both FIs 101A and 101B have checks drawn on the other FI, FIs 101A and 101B deliver cash letters 113A and 113B, respectively, to the other FI via a courier service 114 that physically transports the cash letter 113 to the respective FI.

Once the cash letter 113 has been produced, the ECP system 105 at each FI prepares, using the same MICR line stored in the CPCS MDS data file, electronic cash letters for each "paper" cash letter 113A and 113B that is sent. This electronic cash letter is then sent to the respective FIs, using standard communication techniques over one or more electronic or optical data transmission networks 115.

Once received, the electronic cash letters are processed the same day by the receiving FI's ECP system 105 and CPCS 107. Generally, this involves having the ECP system 105 first perform certain preprocessing functions and then present this electronic cash letter containing the MICR information to the CPCS 107. The CPCS 107 then "captures" the checks in the electronic cash letter as if they were physical paper items and sends some or all of these checks to the FI's posting systems, such as the DDA 109. This is called a "non-MICR" capture, as the information is not being read by the CPCS 107 from the magnetic ink characters on the paper checks, but from a "non-MICR" file created by the ECP system 105.

The couriers 114 usually deliver the paper cash letters 113A and 113B to the FIs the next business day. Upon arrival, the paper checks are placed in the CPCS 107 sorters at the receiving FIs for capture by the CPCS system 107. After capture, the ECP system 105 reconciles the electronic and the paper cash letters with the MICR line. The checks are then handled in the usual manner by the FIs.

Figure 2:
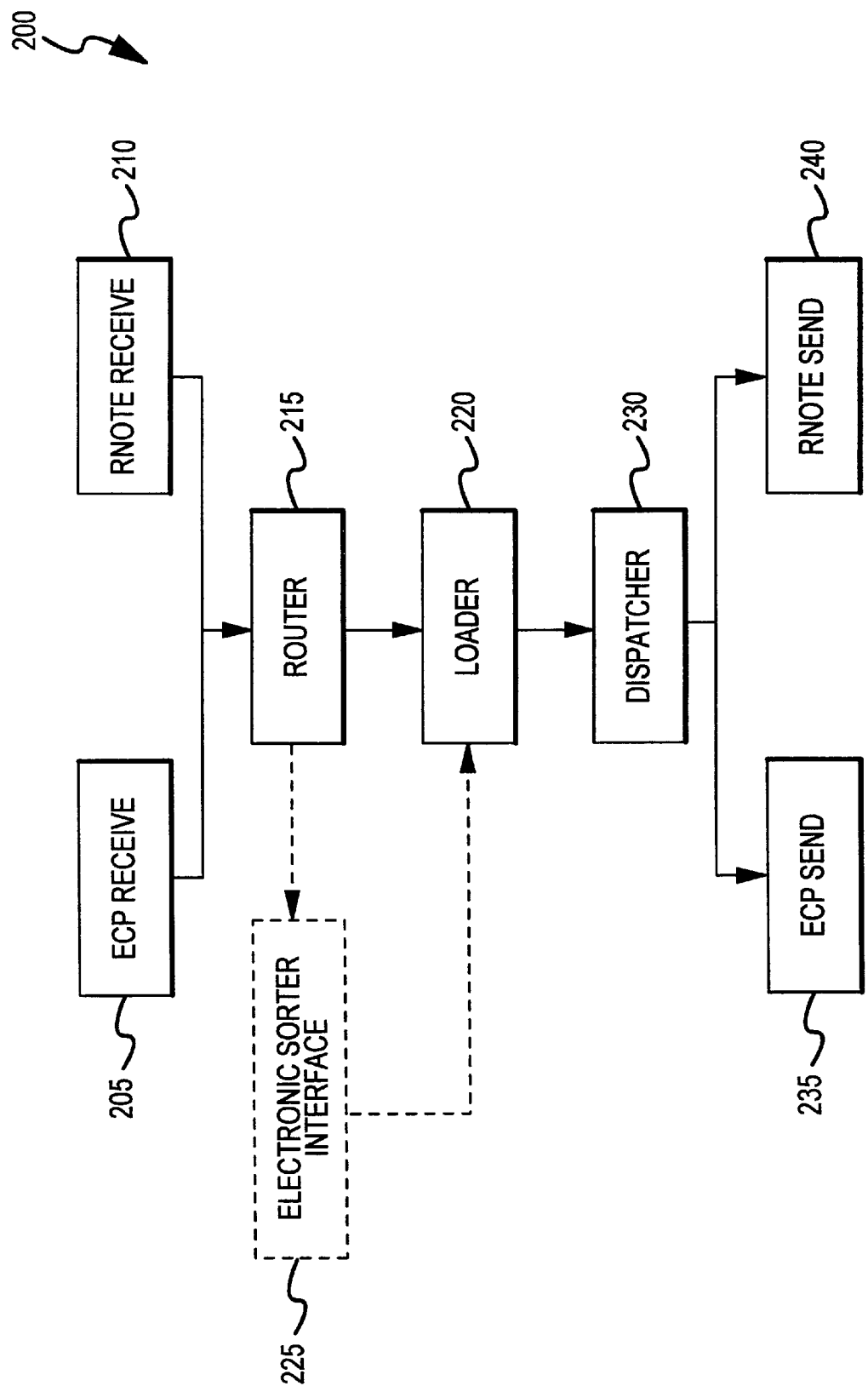
FIG. 2 illustrates an overall schematic representation of a method of clearing electronic items that allows multi-staged sorting of the electronic items as the electronic items proceed through the electronic presentment process of FIG. 1.

The foregoing is a general description of the functioning of a basic ECP exchange. FIGS. 1 and 2 illustrate further details of the ECP system. Basically, the ECP System has two major subsystems: 1) a send subsystem and 2) a receive subsystem. An additional but critical component of the ECP system is an on-line customer information file ("CIF") 205 system, that is common to both the send and receive subsystems and will be first discussed without reference to the drawing figures. In the preferred embodiment, the ECP process is implemented with a general purpose digital computer whose operation is directed by a program such as the one disclosed in the microfiche appendix submitted with the parent of this application and that has been incorporated herein by reference.

The On-Line CIF system handles, among other things, on-line maintenance of partner FI records, benefit sharing percentages and edit rules. It also provides a complete data base file list and audit control reporting.

The majority of all benefits derived from the ECP process accrue to the FI receiving the electronic cash letter. Partnership agreements allow each receiving FI to negotiate benefit sharing arrangements independently with each prospective exchange partner, to provide an incentive to the partner for sending electronic cash letters to that FI. A key element of the system, then, is the centralized storage of each of these agreements within a single data base file.

Additional data stored in the CIF system include fields of a general nature that identify the name of the partner FIs, the primary contacts at the partner FIs (for both sending and receiving data) and the telephone number(s) for the primary contacts. Data fields that are more specific are defined to include identification numbers for the partner FIs, such as R/T numbers, version numbers of the record formats to be sent to and received from the partner FIs, send and receive cut-off times that define the target deadlines for the partner FIs, and send and receive cash letter maximums that define the maximum number of cash letters allowed for transmission to and receipt from each partner FI.

The CIF system also includes fields that pertain to benefit sharing for each of the partner FIs. These fields store the benefit percentages to be applied to the electronic cash letters that are sent to or received from the partner FIs for each day of the week. Finally, the CIF system includes fields that are used to maintain information relating to the partner FI's records such as the date and time associated with the last update of the CIF records, as well as identification of the FI employee responsible for the last update.

The maintenance portion of the CIF system comprises modules for adding, updating and deleting partner FI CIF records. The add function allows an authorized FI employee to input all partner FI data as detailed in the section discussed above. The system contains logical edits that prevent a FI employee from entering duplicate records (based on record type and FI-ID fields). In addition, the system does not allow for sending data to or receiving data from, partners with whom such exchanges have not been authorized in the CIF. To ease the entry of information into the add screen, the CIF system automatically inserts the current date, time and operator ID into each new record.

The edit/update portion of the CIF system prompts the FI employee to enter the FI identification number for the requested record. The system then displays an edit screen, similar to the Add screen, that contains the data for the requested FI. The system allows an authorized FI employee to modify all fields within the screen except the record type, FI-ID and last update fields. In addition, the edit/update portion of the CIF system provides the same logical edits and automatic entries that are available in the add portion.

The delete/undelete portion of the CIF system allows an authorized FI employee to mark a FI record as deleted as of a specified date. The delete/undelete portion prompts the FI employee to enter the FI-ID number for the requested record. It then displays a screen, similar to the add screen, containing information for the particular FI requested. The delete/undelete portion allows the FI employee to close the account by entering an account closed date into the system. If, at a later time, the FI employee wishes to re-open an account, it can be done by entering zeros in the account closed date field.

The CIF system also includes audit reporting features that detail the changes made to the CIF database, whether through adds, edits or deletes. The system prompts the FI employee to enter the start date for the report, with the end date of the report being the current system date. The CIF system scans the CIF database and selects only those records that fall within the date range specified. The system then formats and prints a list of all data fields along with the corresponding changes to the data fields. In addition to these features, the CIF system includes the ability to print out a detailed listing of all partner FI records currently on the CIF database.

Turning now to FIG. 2, illustrated is an overall schematic representation of an ECP commingle process of clearing electronic items, generally designated 200, that allows multi-staged sorting of the electronic items as the electronic items proceed through the electronic presentment process of FIG. 1. The ECP commingle process 200 contains an ECP process 205 (see, FIG. 3) and an RNOTE receive process 210 (see, FIG. 4) that, together, provide input data to a commingle router process 215 (see, FIG. 5). The commingle router process 215 may pass the input data indirectly to a loader process 220 through an ESI process 225 (see, FIG. 6) or directly to the loader process 220 (see, FIGS. 7 and 8). A commingle dispatcher process 230 (see, FIG. 9) prepares the input data to be sent. Finally, an ECP send process 235 and an RNOTE send process 240 (see, FIGS. 10 and 11, respectively) cooperate to transmit the data to one or more intermediaries or payor FIs.

Figure 3:
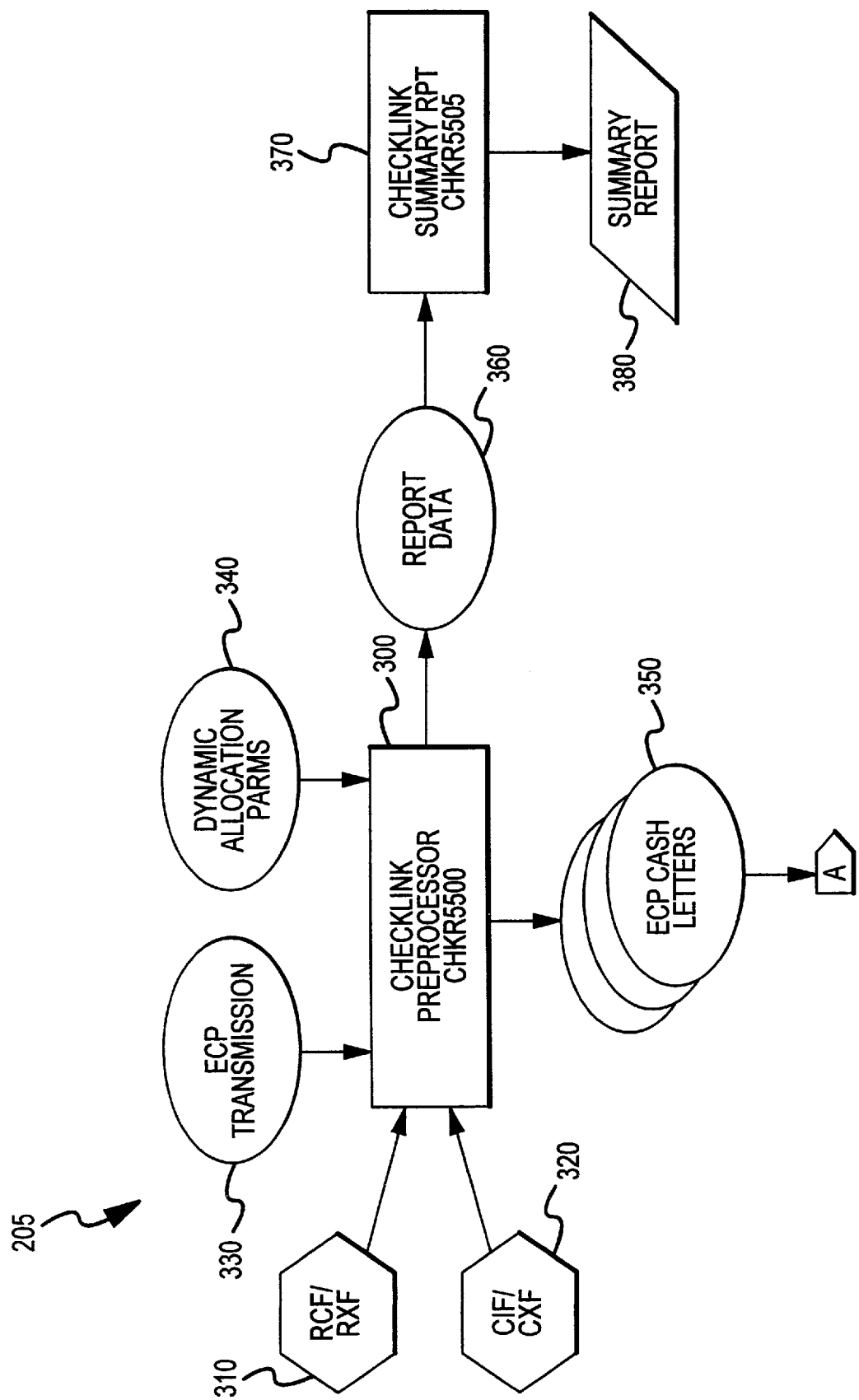
FIG. 3 illustrates a schematic representation of an ECP receive process of FIG. 2.

Turning now to FIG. 3, illustrated is a schematic representation of the ECP receive process 205 of FIG. 2. A preprocessor routine 300 receives a Receive Control File ("RCF") and associated receive cross-reference file ("RXF") 310, a Customer Information File ("CIF") and associated customer cross-reference file ("CXF") 320, an incoming ECP transmission 330 and dynamic allocation parameters 340 to generate one or more ECP cash letters 350 and report data 360. The report data may be processed in a summary report routine 370 to yield a summary report 380.

Figure 4:
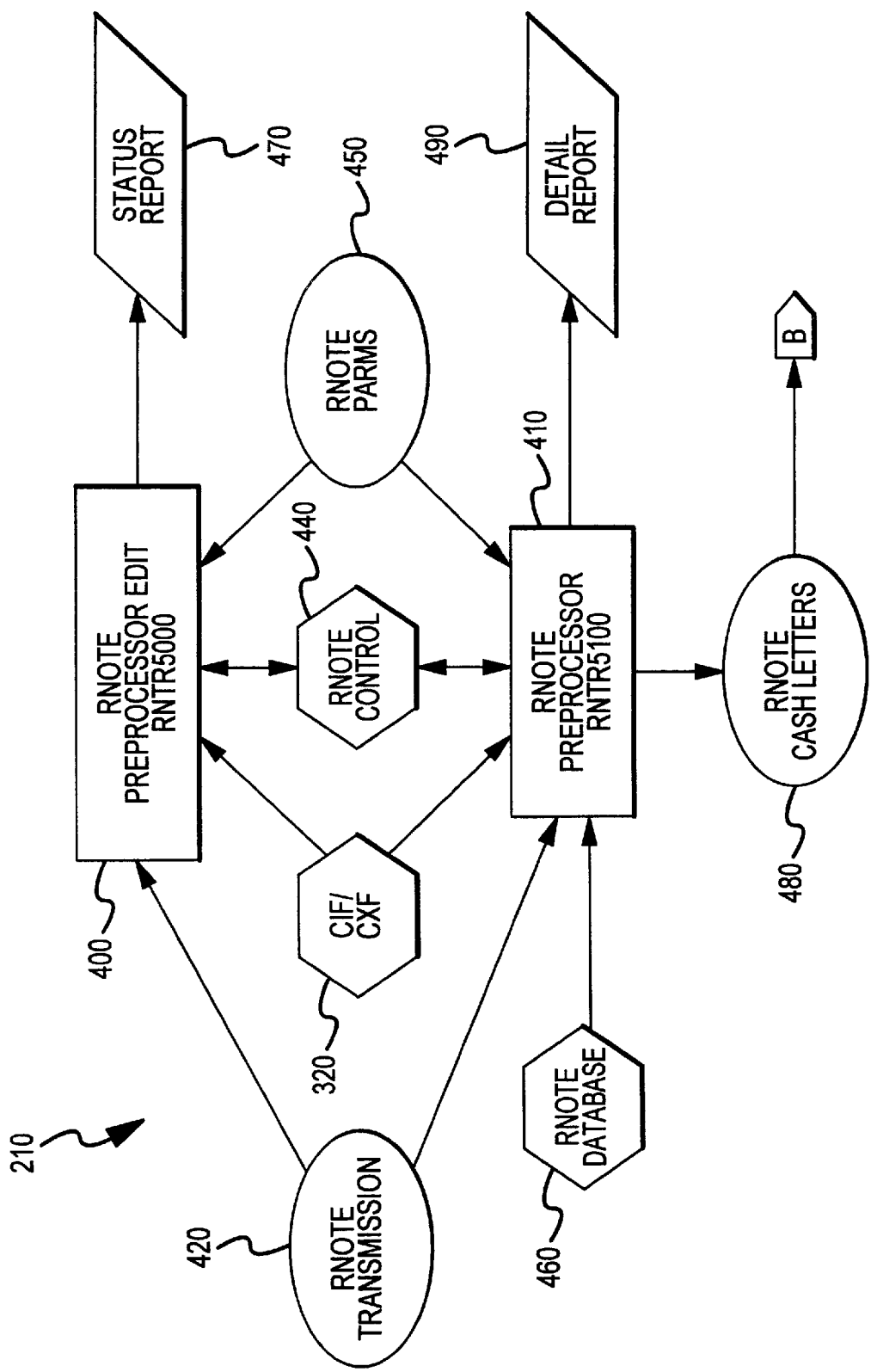
FIG. 4 illustrates a schematic representation of a return item notification ("RNOTE") receive process of FIG. 2.

Turning now to FIG. 4, illustrated is a schematic representation of the RNOTE receive process 210 of FIG. 2. An RNOTE preprocessor edit routine 400 and an RNOTE preprocessor 410 jointly receive an incoming RNOTE transmission 420, the CIF 320, an RNOTE control file 440 and an RNOTE parameters file 450. Additionally, the RNOTE preprocessor 410 receives data from an RNOTE database 460. The RNOTE preprocessor edit routine 400 produces a status report 470. The RNOTE preprocessor 410 produces RNOTE cash letters 480 and a detail report 490.

Figure 5:
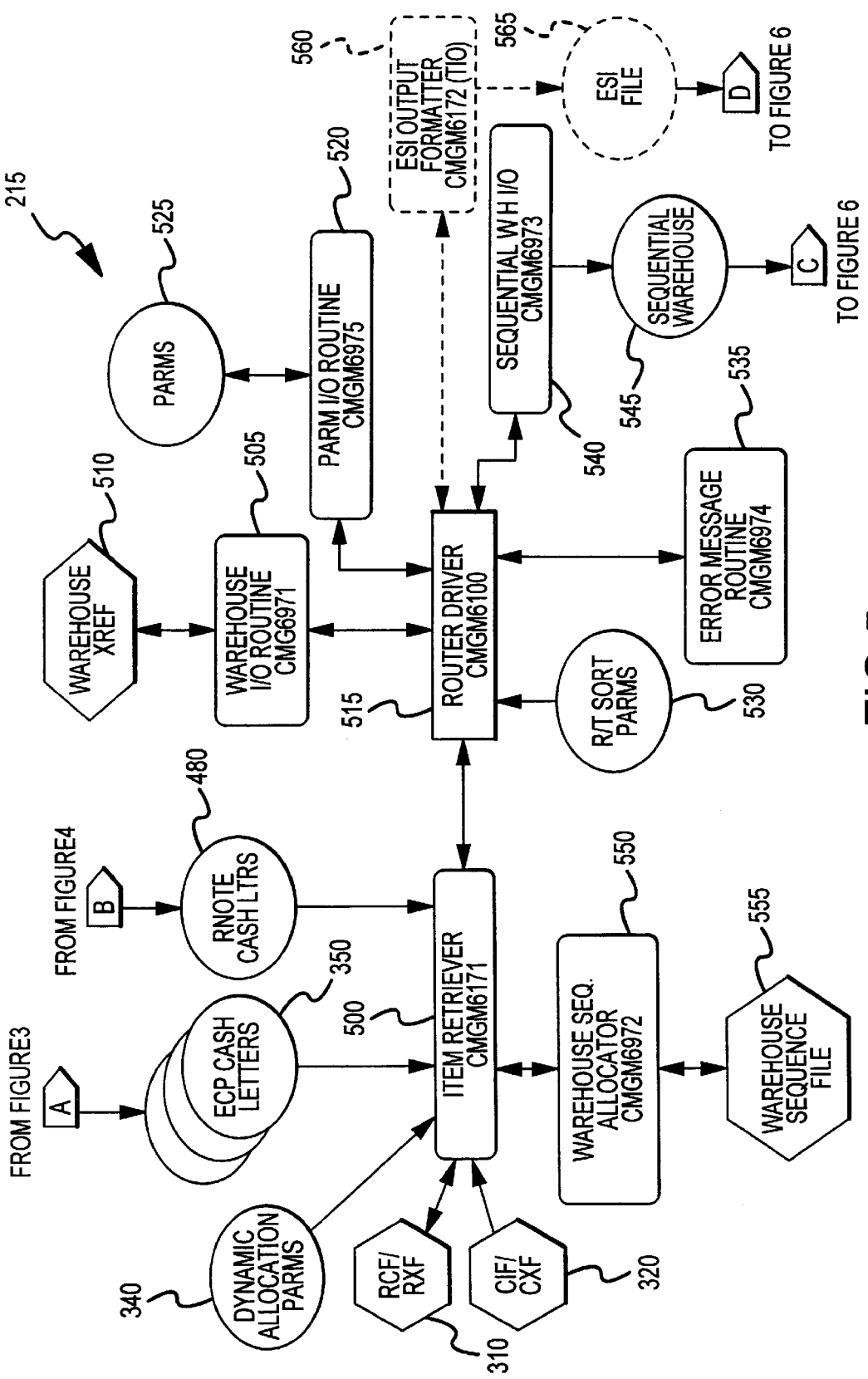
FIG. 5 illustrates a schematic representation of a commingle router process of FIG. 2.

Turning now to FIG. 5, illustrated is a schematic representation of the commingle router process 215 of FIG. 2. The commingle router process 215 is the primary entrance point for ECP commingle process 200 processing according to the present invention. The commingle router process 215 is made up of several modules. Each of the modules listed below is discussed in greater detail. The ECP cash letters 350 of FIG. 3 and the RNOTE cash letters 480 of FIG. 4 are received into an item retriever 500, along with the RCF 310, the CIF 320 and the dynamic allocation parameters 340. A warehouse input/output ("I/O") routine 505 provides an interface between a warehouse cross-reference file 510 and a router driver module 515. Likewise, a parameter I/O routine 520 provides an interface between a parameters file 525 and the router driver module 515. The router driver module 515 receives R/T sort parameters from an R/T sort parameters file 530 and communicates with an error message routine 535. A sequential warehouse I/O routine 540 provides an interface between a warehouse file 545 and the router driver module 515. A warehouse sequence allocator module 550 manages data flow between a warehouse sequence file 555 and the item retriever module 500. Finally, an optional ESI output formatter module 560 formats data flowing from the router driver module 515 to an ESI file 565.

An ECP commingle item is usually part of a bundle of items. Many bundles make up what is collectively known as a "cash letter". Each incoming item is written to an All-Items File ("AIF") out of the preprocessor routine 300 of FIG. 3.

The router driver module 515 is the main program in the commingle router process 215. As a "driver" module, the job of the router driver module 515 is to call other modules (subroutines) to perform specific tasks necessary to process each incoming item.

Each electronic item is sent to the router driver module 515 via the item retriever module 500. To obtain ECP forward presentment items, the item retriever module 500 scans the RCF 310 looking for commingled cash letters that have not been previously processed. Upon finding an unprocessed cash letter, the item retriever module 500 sends the items back to the router driver module 515. To obtain RNOTE items, the item retriever opens the RNOTE cash letters 480 created by the RNOTE preprocessor and passes each item back to the router driver module 515.

ECP forward presentment items processed by the router driver routine 515 may or may not be dispatched later to a partner FI. This is determined by the destination endpoint assigned to the items either internally or externally during subsequent processing.

RNOTE items are, by definition, always able to be dispatched and sent back to the original ECP sending FI. The ECP forward presenting FI's R/T, as well as the presenting FI's item sequence number are stored in an item cross-reference file during ECP forward presentment router driver module 515 processing. This file advantageously provides a unique electronic sequence number for each item. When an RNOTE is returned, the router driver module 515 accesses the cross-reference file using the electronic sequence number (sent back on the RNOTE) and assigns the presenting FI's R/T as the new destination endpoint for the RNOTE. The original ECP item sequence number of the item is also placed on the item so the presenting FI is able to identify the ECP item that corresponds to the RNOTE.

The ECP commingle process 200 assigns a unique inbound cash letter number and a unique electronic item sequence number. The warehouse sequence allocator module 550 is called by the item retriever module 500 to assign these numbers. Based upon user parameters retrieved by the parameter I/O routine 520, the router driver module 515 hands off each item to the user-specified, optional ESI output formatter module 560.

If the output formatter module 560 is to provide an interface to a Unisys Item Processing System ("IPS") environment, the output formatter module 560 formats the output file in accordance with the Unisys Tape Input/Output Module ("TIO") standard. The output file is then sent to the Unisys IPS system for sort pattern processing in the Unisys Tape Electronic Check ("TEC") file format. The items are then processed by IPS, electronically pocketed, and the information sent back to the ECP commingle process 200 specifying the ECP endpoint number for ECP-dispatchable endpoints.

If the output formatter module 560 is for the IBM Check Processing Control System("CPCS") environment, the output formatter module 560 formats the output file for CPCS On-Line Reject Repair ("OLRR") processing. The OLRR processing may then assign pocket codes and user bytes for each item. The file may then be passed into CPCS for kill distribution and subsequent cash lettering. The endpoint information can then be sent back to the commingle process 200 for subsequent dispatch.

If the commingle site is to use internal endpoint identification, then before an item is handed off to the output subroutine, the router driver module 515 looks up the appropriate endpoint in a preloaded table within the R/T sort parameters file 530. The router driver module 515 evaluates the preloaded table for each occurrence of the item's R/T value, terminating only until no further R/Ts have been found. This multiple search is required due to the possible presence of multiple dispatch types. Multiple dispatch types are more fully explained below.

If the commingle site is going to use an external endpoint identification, then either IPS, CPCS, or some other system preferably selects the endpoints for the ECP items. In this case, the system parameter 'default ECP endpoint' is used temporarily to fill in the endpoint value until it is overwritten at a later stage.

After the router driver module 515 is finished, and depending on whether the endpoints are assigned externally or not, the items are sorted into the right sequence for loading into the ECP commingle warehouse. This sort process is done by a pre-loader report module (to be described more fully below). The pre-loader report module can be run either after the router driver module 515 has run or just prior to running the loader process 220. This report may show either detail or summary information by site, partner and cash letter. The summary totals may show totals for good incoming items, rejected items (due to unreadable fields), as well as grand totals by incoming cash letter. Unreadable fields may be defined as invalid characters in either the R/T, account or amount fields. Items with any of these unreadable fields are not loaded into the ECP commingle warehouse and therefore cannot be dispatched to the receiving FI.

The pre-loader report module may optionally be run after the ESI process 225 has completed. The ESI process 225 will now be described.

Figure 6:
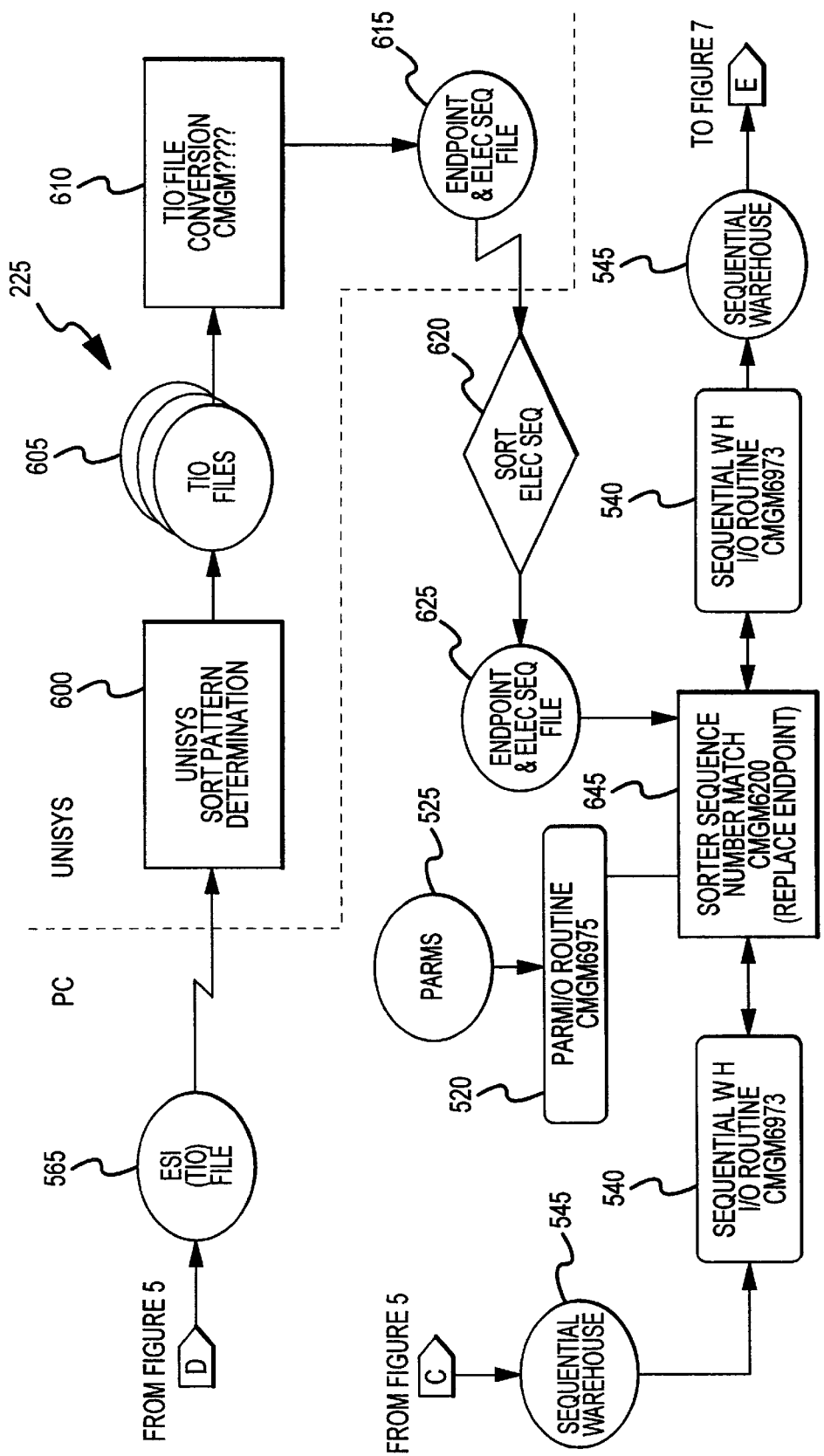
FIG. 6 illustrates a schematic representation of an electronic sorter interface ("ESI") process of FIG. 2.

Turning now to FIG. 6, illustrated is a schematic representation of the ESI process 225 of FIG. 2 as it is adapted to operate with the Univac TIO standard. The ESI process takes the ESI file 565 of FIG. 5 and provides it to a Univac computer, which processes the contents of the ESI file 565 in a Unisys sort pattern determination process 600. This process 600 produces TIO files 605, that are converted in a TIO file conversion process 610 into an endpoint and electronic sequence file 615. Processing now continues outside the Univac computer.

The endpoint and electronic sequence file 615 is sorted in a process 620 to yield a sorted endpoint and electronic sequence file 625. As before, the sequential warehouse I/O routine 540 provides an interface to the warehouse file 545. Likewise, the parameter I/O routine 520 provides an interface to the parameter file 525. A sorter sequence number match module 645 interacts with the sequential warehouse I/O routine 540 and the parameter I/O routine 520 and receives the sorted endpoint and electronic sequence file 625 to interact with the sequential warehouse I/O module 540 and the warehouse file 545, which has now been sorted.

The ESI process 225 is a separate component of the ECP commingle process 200 and is used when external endpoint assignment is desired. The ESI process 225 allows a FI to use existing paper-based sort patterns for endpoint selection. For each occurrence of the R/T in the R/T table, a default commingle endpoint value is returned. However, if the Unisys IPS or IBM CPCS systems are used ultimately to determine endpoint selection, the endpoint values found by the router driver module 515 may be overridden during a subsequent match/merge process. A parameter may be used in the ECP commingle process 200 to determine whether a search in the R/T table should be performed (internal) or whether the ESI process 225 is to provide the item's endpoint value (external).

The match/merge process requires that the commingle "system-generated" item number be carried into either Unisys IPS or IBM CPCS and returned along with the new endpoint. For the Unisys IPS environment, there is an 18 byte user field that may be employed to hold the commingle-assigned item sequence number. This sequence number can be used during the match/merge process to locate the original incoming item. It is carried into IPS during the Tape Input Port ("TIP") processing, through the ITMx (item) file, and out through the reading of pocket information (strings).

During the match/merge process, the old (default) endpoint selected by the router driver module 515 from the R/T table is preferably overwritten by the new endpoint. To replace the old endpoint with the new endpoint value, the items are sorted by the original item sequence number generated by the item retriever module 500. The merge process unites the original items with the new endpoint value before being loaded into the ECP commingle warehouse.

The ESI process 225 is entirely optional. An FI may wish only to use the R/T table associated with the router driver module 515. However, the present invention advantageously provides the ability to use existing paper-based sort patterns to ensure that, to where the paper is sent, so goes the electronic item.

As previously mentioned, there may be multiple look-ups in the internal R/T table, depending on what types of items are being processed. To allow for flexible dispatching by different categories of items, the ECP commingle process 200 of the present invention introduces a concept known as a "window type" or "dispatch type". These terms are synonymous and refer to a different classification of items. An entry may be made in the R/T table for these different types of items. The presence of multiple dispatch types in the R/T table requires the router driver module 515 to continue searching the table for a match on the same item until no further matches are found.

CIF send partners define electronic and informational receive-capable endpoints in today's financial infrastructure and in the ECP commingle process 200. ECP commingle send windows and normal send windows are conceptually similar, but substantial processing differences exist. These differences are described below.

An ECP commingle send window is generally defined as the earliest initiation time of the ECP forward presentment, RNOTE or informational send extract process for a given send partner. Under the ECP commingle process 200, each send partner definition may specify a time that the partner expects to receive an electronic transmission. This transmission may be for normal ECP forward presentment items, for RNOTE items or for info (paper matching information) items.

Multiple types of window definitions are allowed in the dispatch parameters for maximum flexibility. This allows a send partner to be defined as receiving different types of files at different times of the day. In the illustrated embodiment, the following dispatch types are allowed and can be associated with different dispatch times:

F=ECP forward presentment cash letters only.
I=Info (paper matching information) cash letters only.
R=Any RNOTE cash letters.
P=Preliminary RNOTE cash letters only.
S=Secondary RNOTE cash letters only.
N=Final RNOTE cash letters only.
*=Any cash letters.

The electronic window defines the extract start time for normal electronic ECP commingle forward presentment. According to the above codes, the dispatch type for this item would be coded "F" for forward presentment.

The RNOTE window defines the extract start time for preliminary, secondary and final types of RNOTE forward presentment. According to the above codes, the dispatch type for this item would be coded "R", "P", "S", or "N" for RNOTEs.

It is possible that electronic commingled items could be sent to one location and the physical paper routed to another location. The site where the paper is processed preferably should be given the electronic routing summary information on each item. The informational window defines the extract start time for the info files.

It is important to note that regardless of where the paper is processed, an info file is most preferably created as part of ECP commingle. This file can either be loaded into the ECP commingle warehouse for dispatching to another paper processor location. Or, it can stay resident at the commingler site and be used as the source of electronic item data during the electronic-to-paper match process. The info file data most preferably includes the endpoint number assigned to the electronic item, as well as the originating partner R/T that originally sent the item to the commingler.

The informational window type may require that a partner R/T and endpoint be established in the ECP commingled sort pattern table for any partner that sent items to the ECP commingle system. This would allow for proper paper matching information to be sent to the location where the paper is processed.

Most preferably, the info file should retain the original cash letter sequence of items (cash letter integrity) to ensure proper paper matching. When the paper processor is not the commingler, then a dispatch parameter is required and the dispatch type for informational window would be coded "I". When the paper processor is the commingler, then no dispatch parameter should exist, since the loader process 220 calls a module to create a file specifically used for paper matching at the commingler.

The item retriever module 500 is called by the router driver module 515 to retrieve either ECP forward presentment items (standard preprocessor work) or RNOTE items. Each item is marked as to whether it is a forward presentment ("F") or any of the above codes for RNOTEs.

The router driver module 515 looks up the endpoint R/T value as well as the dispatch type. Multiple occurrences of the same R/T and endpoint can occur in the table for different dispatch types. The following entries illustrate how multiple endpoints can be present in the R/T table for the same item R/T:

| | |
|---|---|
| (Entry 1) R/T: | 0711-1211 |
| | Endpoint: 0710-0003 |
| | Dispatch type: F (forward presentment) |
| (Entry 2) R/T: | 0711-1211 |
| | Endpoint: 0430-1291 |
| | Dispatch type: I (routing summary/informational) |
| (Xref 1) R/T: | 0711-1211 |
| | Endpoint: 1210-0002 |
| | Dispatch type: R (RNOTE) |

From the above example, it can be seen that the item R/T (0711-1211) occurs three times, but for different dispatch types. In this example, the forward presentment item would be sent to the electronic endpoint 0710-0003 while the paper information would be sent to 0430-1291.

The third example is be found in the cross-reference file. It is an RNOTE with the same item R/T, but is returned to its presenting FI R/T, in this case 1210-0002. There is no entry in the look-up table as the item endpoint is retrieved from the cross-reference file.

If the endpoint value for an "I" (informational) dispatch type in the R/T table matches the commingler site R/T, then this would indicate that the paper is processed (and therefore matched) at the commingler site. The parameter I/O routine 520 contains the default endpoint values for forward presentment and informational items. These default values may be used in the event that the router driver module 515 cannot successfully find the endpoint during the R/T lookup process.

The ESI process 225 can optionally be used later to override any endpoint value selected during the router driver module 515 R/T look-up process. The warehouse file 545 created during the router driver module 515 processing has the same format as the file created during processing in the ESI process 225. The loader process 220 would not know the difference and loads the warehouse file 545 from either source into the warehouse.

The ESI endpoint file contains only ECP-dispatchable items and is preferably used to replace any previously selected endpoints during the R/T look-up process.

Figure 7:
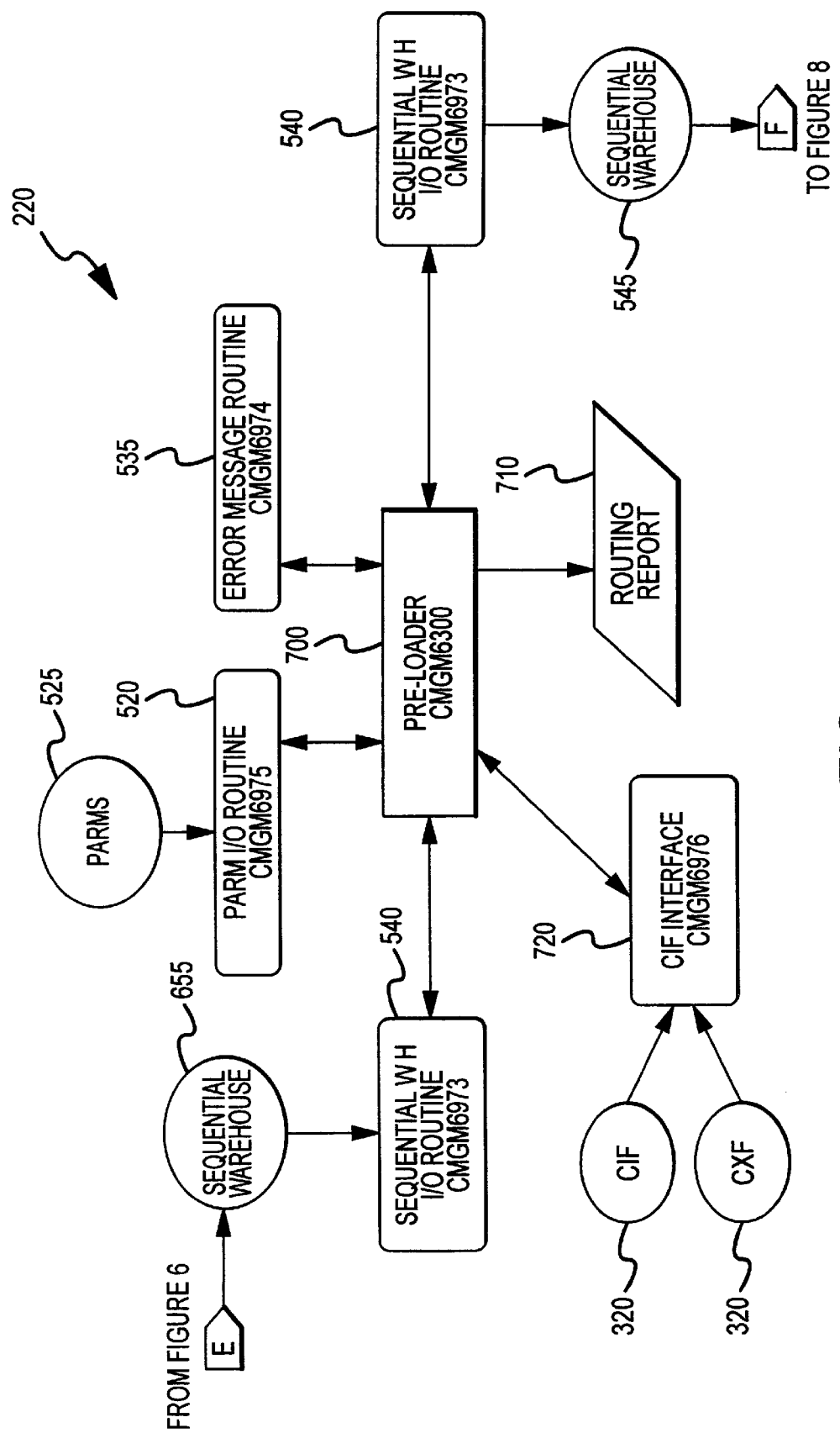
FIG. 7 illustrates a schematic representation of a commingle pre-loader/sort/report process of FIG. 2.
Figure 8:
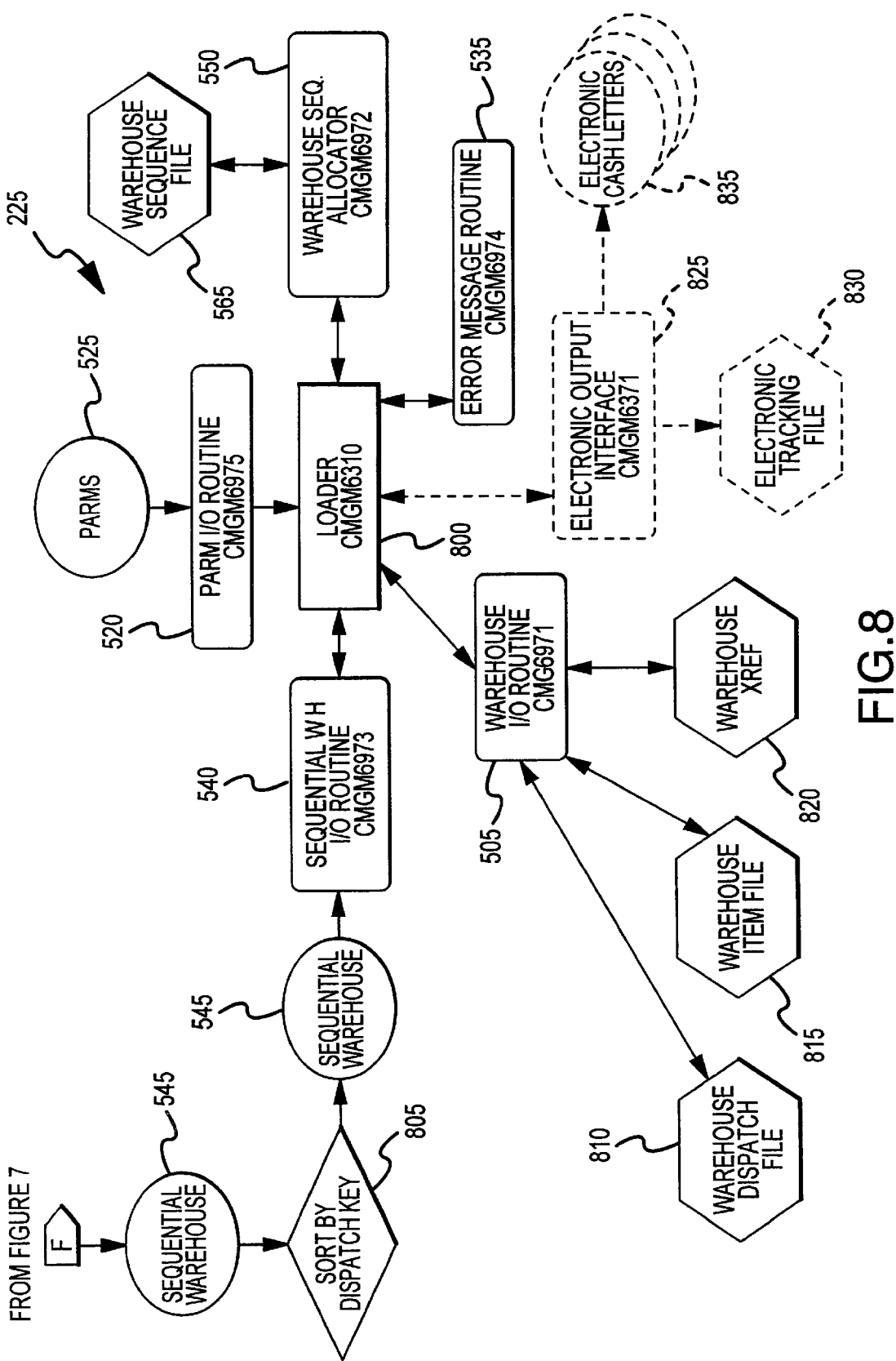
FIG. 8 illustrates a schematic representation of a commingle loader process of FIG. 2.

Turning now to FIGS. 7 and 8, illustrated are a schematic representations of a commingle pre-loader/sort/report and commingle loader processes 220. FIG. 7 introduces a pre-loader module 700 that produces a routing report 710 by reading the CIF and associated CXF (collectively, 310) via a CIF interface module 720. FIG. 8 introduces a loader module 800 that, via an electronic output interface 825, produces an electronic tracking file 830 and one or more electronic cash letters 835.

The pre-loader module 700 sorts the items in the warehouse file 545 into dispatch key sequence for the loader module 800. It also creates a report of the info file items.

Since the info file contains all items, not just those that are ECP-capable, the report is essentially a report of all incoming items by inbound cash letter. This report can either be a detail report of all items, or just a summary by cash letter and site.

The loader module 800 then takes the sorted items (sorted by a sort process 805) from the sorted warehouse file 545 and loads them into the ECP commingle warehouse. For info files, depending on whether or not the destination endpoint is the commingler site itself, the loader module 800 determines if these items should be stored in the commingle warehouse.

Where the paper processor is not the commingler site, then these items is loaded into the ECP warehouse for future dispatching. This assumes that an info endpoint has been selected and stored on each item. However, if the paper processor is the commingler site, an info file user exit is called to store the routing summary information separately in a dynamically-allocated file for subsequent matching.

The commingle ECP warehouse consists of multiple high-performance Virtual Storage Access Method ("VSAM") Key-Sequence Data Set ("KSDS") files for optimal storage/retrieval of item data. The warehouse files themselves are made up of five types:

Dispatch File 810—each record in the dispatch file 810 contains site, process date, endpoint, dispatch cash letter type, inbound cash letter information and a pointer to the item block file. Each record in the dispatch file 810 corresponds to a single inbound cash letter and dispatch endpoint combination.

Item Block File 815—the item block file 815 contains ECP forward presentment, RNOTE, or info items. Each record may contain up to 160 items. One or more records in the item block file 815 corresponds to each dispatch record.

Cross-reference File 820—records in the cross-reference file 820 are keyed by the electronic sequence number. They contain the original sender's sequence and R/T information for each ECP forward presentment item written as each item is received. As RNOTE items are received, the cross-reference file is randomly accessed to assign the original information to the RNOTE items.

Sequence File 555—the warehouse sequence file 555 contains only four records: the last block number, electronic sequence number, inbound cash letter number and outbound cash letter number assigned by the commingle system.

Originator Index File (not shown)—records in this file are built at the same time as the dispatch records. This file is just an index allowing the online screens to display information in originator order as well as endpoint order.

A sequence number cross-reference file (not shown) is constructed for RNOTE purposes. For outbound RNOTE items that need to be sent back to the presenting FI, this same cross-reference file is used by the router driver module 515 to overwrite the item with the original sender's sequence number and endpoint (partner R/T) value.

Due to the design of the warehouse dispatch and item VSAM files, control interval splits are minimized during loader module 800 processing. Each dispatch record points to an item block containing the outbound items. The warehouse sequence allocator module 550 is called to assign new outbound cash letter numbers and block numbers. New block numbers are accessed and used by the commingle dispatcher process 230 in ascending sequence fashion. This prevents VSAM degradation by not allowing random inserts into the warehouse item file.

The router driver module 515 uses the sequential warehouse I/O module 540 to create the sequential output file to be loaded into the commingle warehouse. This module 540 is also used to read items from the warehouse file 545 to create the pre-loader reports as well as feed items for the loader module 800 into the ECP warehouse. Once the loader module 800 has completed its loading of the items into the warehouse, the warehouse file 545 is backed up and deleted. It is no longer needed during commingle processing.

Figure 9:
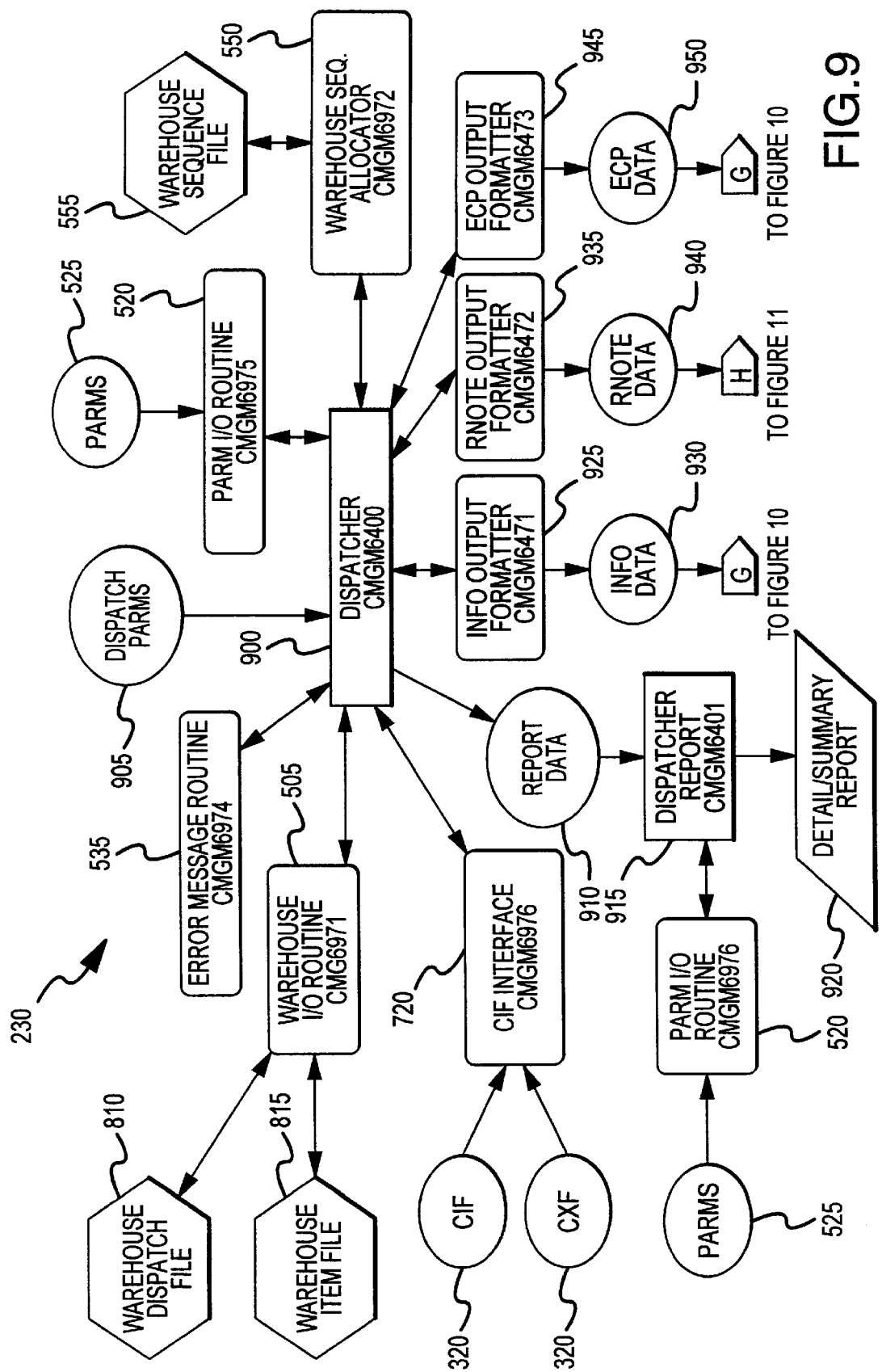
FIG. 9 illustrates a schematic representation of a commingle dispatcher process of FIG. 2.

Turning now to FIG. 9, illustrated is a schematic representation of the commingle dispatcher process 230 of FIG. 2. FIG. 9 introduces a dispatcher module 900 that interacts with a dispatch parameter table 905 to produce, via a report data process 910, a dispatcher report 915 and a detail/summary report 920. The dispatcher module 900 also produces 3 formatted data files. Using an info data formatter module 925, an info data file 930 is produced. Using an RNOTE output formatter module 935, an RNOTE data file 940 is produced. Using an ECP output formatter 945, an ECP data file 950 is produced.

A PC-based or mainframe job scheduler is programmed for send times corresponding to dispatchable send windows and initiates the commingle dispatcher process 230 electronically to send the corresponding items to the corresponding send partner (endpoint) at the scheduled time.

The commingle dispatcher process 230 reads the commingle warehouse, extracts and marks as "dispatched" any eligible dispatch records. The time that an endpoint is to be dispatched is based upon the dispatch parameter table 905. The dispatch parameter table 905 is maintained by the user and can be changed at any time prior to running the commingle dispatcher process 230. The dispatch parameter table 905 contains the endpoint, dispatch type, dispatch time value and a parameter indicating that the time is 'current-day' or 'next-day'.

Any endpoints that have not been dispatched and show a dispatch time value less than the current time are eligible for dispatch. A block pointer field in the dispatch record is used to locate the initial starting point to read the item block file 815. Each item in the item block file 815 is assigned to an outbound cash letter.

If the outbound cash letter is an ECP forward presentment or a dispatchable info type, the data is given to the ECP send process 235 for transmission reformatting, management and subsequent transmission. If the outbound cash letter is an RNOTE cash letter, the information is reformatted for input to the RNOTE send process 240.

A dispatch control report is produced for the operator showing what kind of outbound cash letter was produced during the last execution of the commingle dispatcher process 230 and to what endpoint that cash letter was dispatched. The report also identifies which outbound cash letters are left on the file that have not been dispatched and the reason for the non-dispatch status.

The detail/summary report 920 gives more detailed information for the user about the dispatched cash letter, including summary totals by cash letter and site. Detail item information is optional on this report and shows the item's MICR fields along with the originator R/T and the sequence number.

If the paper is processed by another location other than the commingler site, the loader module 800 will have placed all routing summary information for that cash letter into the commingle warehouse. The commingle dispatcher process 230 therefore creates an info output file can be sent to another physical location, if required.

The loader module 800 creates a dispatch record by site, endpoint, date and inbound cash letter number. As previously described, all cash letter numbers assigned for incoming work are most preferably unique and should never be duplicated on a normal, daily basis. The same holds true for the assigned incoming sequence number. The following is an example of how the dispatch file would look after processing two incoming files, one from FI A and one from FI B:

FI A→items destined for FIs X, Y, and Z
FI B→items destined for FIs X, Y, and Z
Dump of Dispatch File:
Record 1: Site: 01, Endpoint X, date, inbound C/L: 01 (from FI A)
Record 2: Site: 01, Endpoint X, date, inbound C/L: 02 (from FI B)
Record 3: Site: 01, Endpoint Y, date, inbound C/L: 01 (from FI A)
Record 4: Site: 01, Endpoint Y, date, inbound C/L: 02 (from FI B)
Record 5: Site: 01, Endpoint Z, date, inbound C/L: 01 (from FI A)
Record 6: Site: 01, Endpoint Z, date, inbound C/L: 02 (from FI B)

As can be seen above, the design of the dispatch key ensures that although the incoming work from both FIs was in separate cash letters, the commingle dispatcher process 230 combines FI A's and FI B's work for each endpoint into a separate and unique outbound cash letter.

When the commingle dispatcher process 230 is finished, a separate file is created to produce unique header and trailer control tickets for each endpoint within each incoming cash letter. During receipt and data preparation, these tickets are placed in front and behind the physical incoming paper from each sending FI. The R/T of the payor FI is placed in the R/T field. The dollar amount field is zeros so as not to influence the control totals for the deposit.

By using these control tickets, the receiving FI is able to identify the source of the work sent to the commingler site, as well as the total items and dollars. The data preparation area should ensure that these tickets are properly placed in the work in order to allow the receiving FI properly to segregate the work.

Using the above example, there are two incoming cash letters and three endpoints. The commingle system should produce six sets of header and trailer records, the product of total incoming cash letters multiplied by the total outbound endpoints. Other than the words 'Header' and 'Trailer,' both tickets have the exact same data printed on them.

For those commingler sites that have CICS capabilities, the ECP commingle system of the present invention offers online maintenance options (transaction code ECMG). The commingle dispatcher process 230 looks for dispatch records with a status of Ready for normal dispatching operations. Once a cash letter has been dispatched, the dispatch status is set to "dispatched." If a cash letter should be canceled, assuming it has not been dispatched, or if a cash letter needs to be re-dispatched for some reason, the online capabilities of ECP commingle can be used. The following actions can be taken:

Select a processing site.
Select the screen view so the dispatch records are displayed in either endpoint (destination) order or origination R/T order.
Select the appropriate cash letter and change its status to "Ready," "Cancelled" or "Dispatched."
Totals are also presented on each screen, whether the view is by endpoint or by originator. The dispatch status can be changed to "Ready," "Cancelled" or "Dispatched." For maximum flexibility, no edits were included that prevent a cash letter from being changed to any of the three status values as many times as desired. The primary intent is to allow a "Dispatched" letter to be changed to a "Ready" status so it can be re-dispatched, but processing situations may require other status changes.

Figure 10:
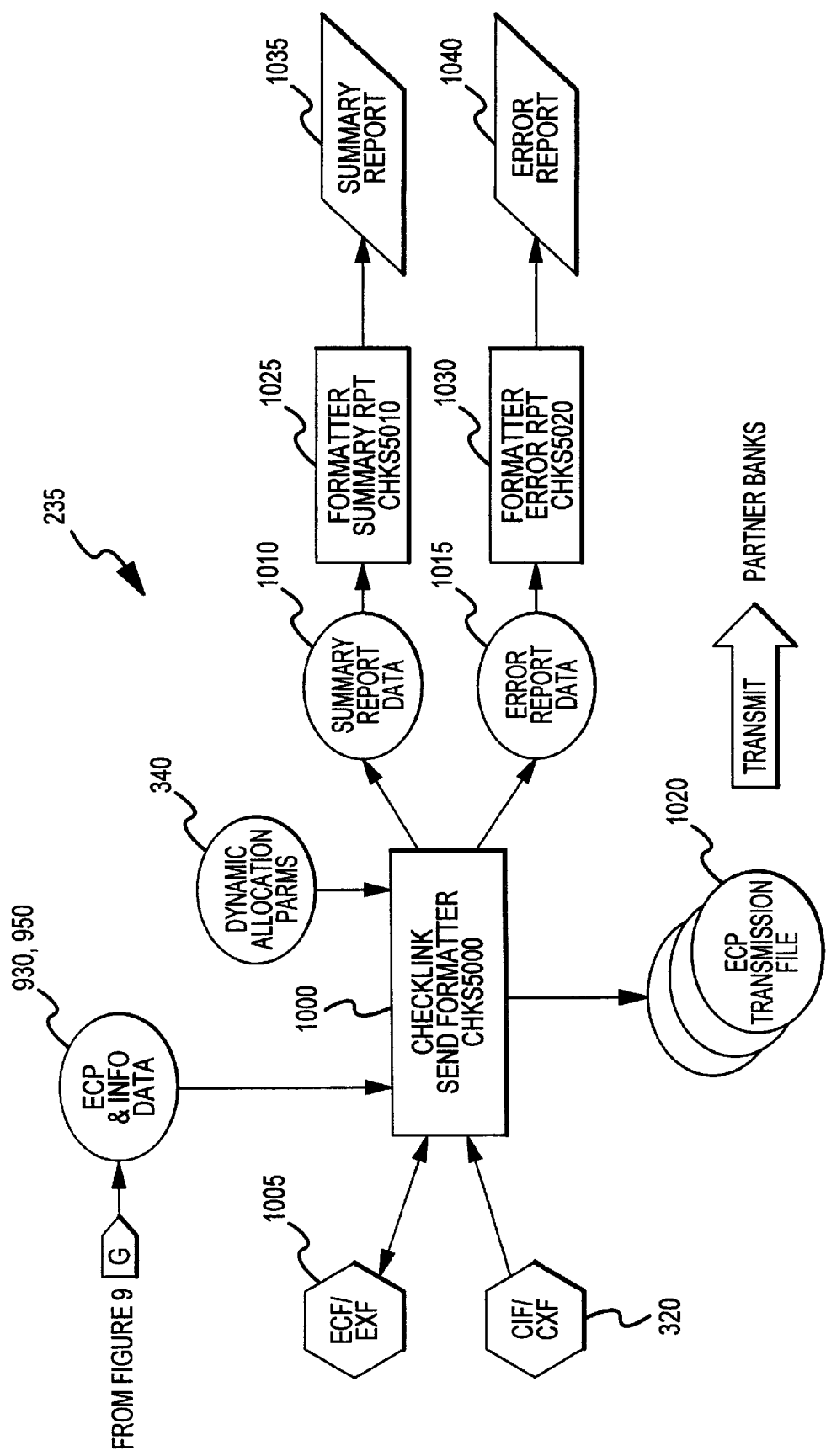
FIG. 10 illustrates a schematic representation of an ECP send process of FIG. 2.

Turning now to FIG. 10, illustrated is a schematic representation of the ECP send process 235 of FIG. 2. The ECP send process 235 employs a send formatter module 1000 that receives the ECP and info data files 930, 950 of FIG. 9, the dynamic allocation parameters 340, an electronic check file and associated electronic check cross-reference file 1005 and the CIF/CXF 320 and produces therefrom summary and error report data 1010, 1015 and one or more ECP transmission files 1020 for transmission to partner FIs. The summary and error report data 1010, 1015 are processed in summary and error report formatter modules 1025, 1030, respectively, to yield formatted summary and error reports 1035, 1040.

Once the commingle dispatcher process 230 has created the electronic output file(s) by endpoint, the file(s) should be transmitted by conventional means final endpoint destination(s). The CICS send system and the RNOTE send system are used to prepare the file(s) for this transmission.

Figure 11:
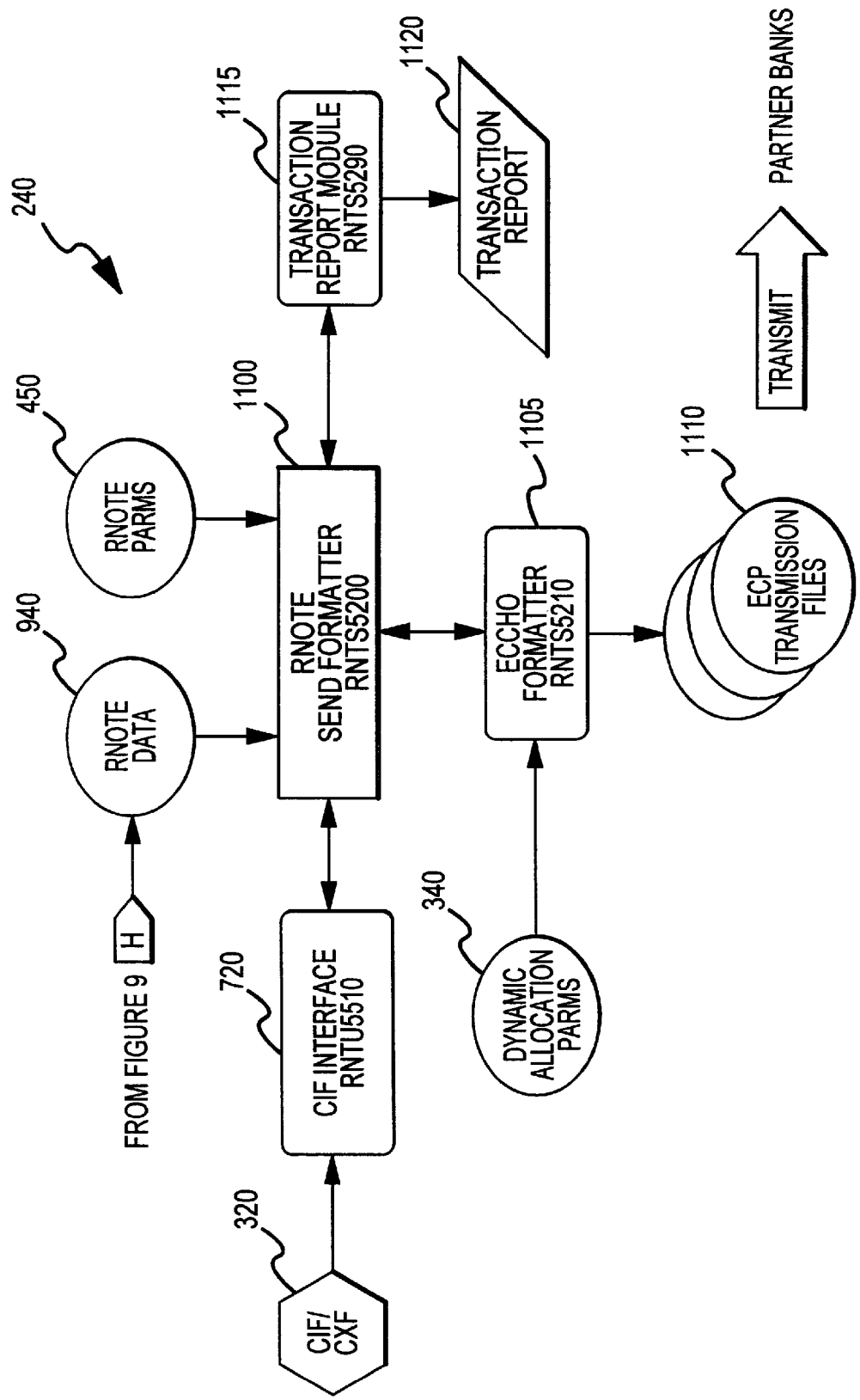
FIG. 11 illustrates a schematic representation of an RNOTE send process of FIG. 2.

Turning now to FIG. 11, illustrated is a schematic representation of the RNOTE send process 240 of FIG. 2. The RNOTE send process employs an RNOTE send formatter module 1100 receives the RNOTE data file 940 of FIG. 9 and the RNOTE parameters file 450 and interacts with the CIF interface module 720 and an ECCHO formatter module 1105 to produce one or more RNOTE transmission files 1110 for transmission to partner FIs. Further, the RNOTE send formatter module 1100 interacts with a transaction report module 1115 to produce a transaction report 1120.

Figure 12A:
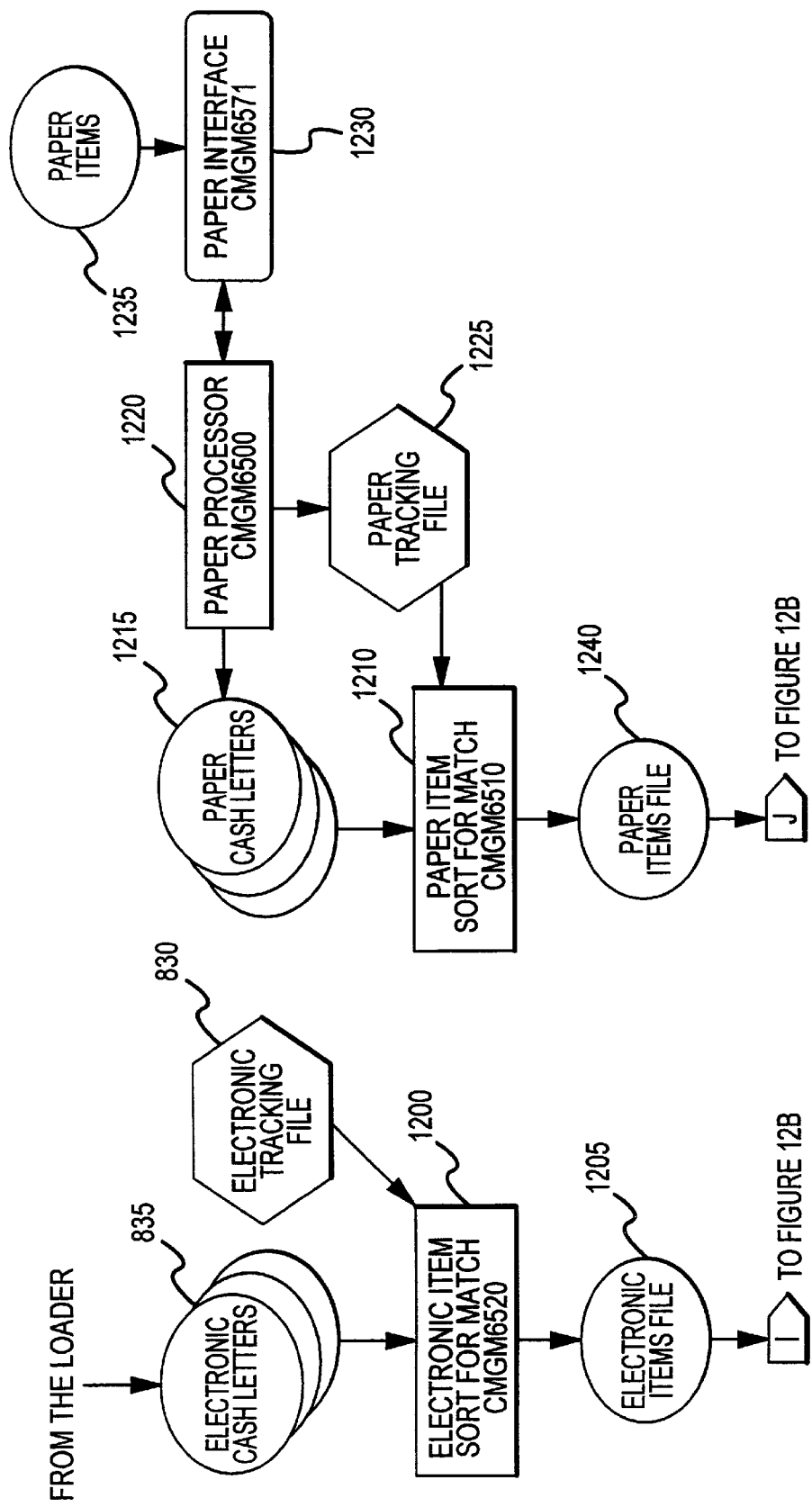
FIGS. 12A and 12B illustrate a schematic representation of a commingle paper match process.
Figure 12B:
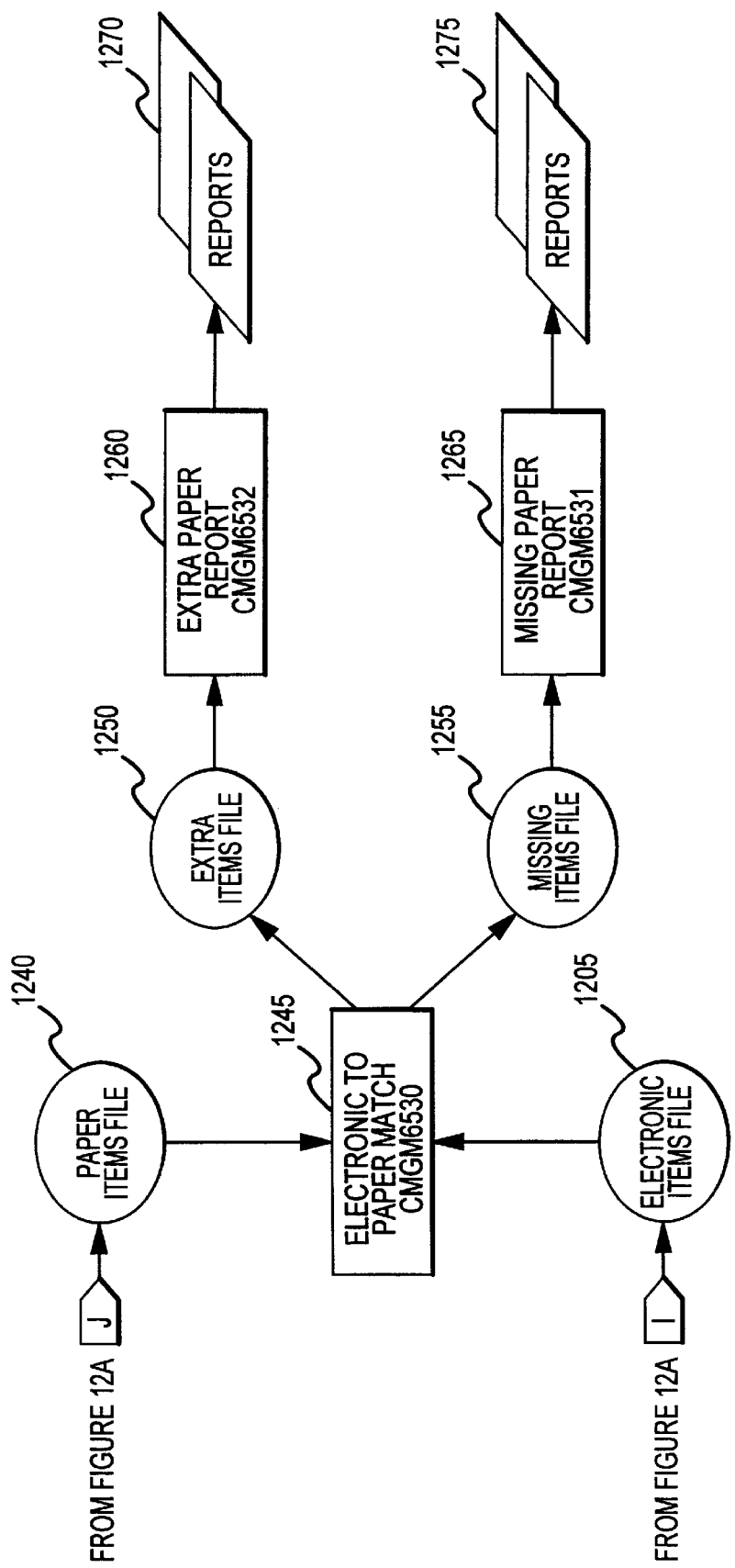

Turning now to FIGS. 12A and 12B, illustrated is a schematic representation of a commingle paper match process. On the electronic side, an electronic item sort for match module 1200 (FIG. 12A) receives the electronic tracking file 830 and the one or more electronic cash letters 835 produced in the commingle loader process 220 of FIG. 8. The electronic item sort for match module 1200 produces an electronic items file 1205 that is provided to an electronic to paper match process 1245 (FIG. 12B).

On the paper side, a paper item sort for match module 1210 (FIG. 12A) receives one or more paper cash letters 1215 provided by a paper processor 1220. The paper processor module 1220 further provides a paper tracking file 1225 to the paper item sort for match module 1210. The paper processor module 1220 interacts with a paper interface module 1230 that, in turn, receives paper items 1235. With the paper cash letters 1215 and the paper tracking file 1225, the paper item sort for match module 1210 produces a paper items file 1240 that is provided to the electronic to paper match process 1245 (FIG. 12B).

As stated before, the physical paper may be processed at either the commingler location or could be sent to a specific paper processing location. Regardless of where the paper is sent, the info file created by the commingler is used for paper-to-electronic matching. This file is the electronic source and contains the standard item information, as well as the electronic endpoint. The electronic endpoint is a number that indicates where the commingle dispatcher process 230 sent the electronic cash letters.

If the paper is not processed by the commingler site, upon arrival at the paper processing location, the info file is processed by the preprocessor routine 300 of FIG. 3. Since these files can arrive at the paper processing site at different time intervals, it is important that the information be edited, balanced and stored until the paper information arrives for subsequent matching. The use of the preprocessor routine 300 may only be necessary for paper that is not processed at the commingler site.

The electronic information needed for reconcilement is controlled in the loader module 800. Based upon a parameter (in the parameters file 525), the system can either create a file to be sent to the warehouse and subsequently dispatched to some other paper processor location, or the data can remain at the commingler site.

If the commingler site is also the paper processing site, then each incoming cash letter item is handed off to an electronic interface I/O module. This module stores the data in dynamically-allocated files, updating a small control file in the system with the necessary information to be able to retrieve this file at a later time. Each file is dynamically allocated at the cash letter level within originating FI. This gives users total flexibility on which electronic cash letter is used for reconcilement.

The physical paper items arrive at the paper processing site and be processed on a special ECP sort pattern. This sort pattern is preferably the same ECP sort pattern used for the electronic items. Most preferably, operations staff should be able to recognize and segregate incoming ECP paper from originating FIs that previously sent an electronic file.

As previously mentioned, the commingle dispatcher process 230 creates the necessary file information to produce special start and end tickets that is used as paper "bookends" for the incoming paper cash letters. These tickets contain the destination R/T and a zero dollar amount.

The paper input process is similar to the electronic process. If the commingler site is also the paper processor, a paper file is handed off to a paper I/O module and the data is stored in a dynamically allocated file, similar to the electronic scenario. When all paper and electronic information has been received by both I/O processes, reconcilement is ready to begin.

The electronic to paper match module 1245 produces two output files: an extra items data file 1250 and a missing items data file 1255. With these files, respective extra paper report and missing paper report modules 126, 1265 produce reports 1270, 1275.

Armed with both control files pointing to all cash letter information, the electronic to paper match module 1245 process reconciles the paper items to their electronic equivalents. This is preferably done by individually sorting all electronic items together at the MICR code-line level, sorting all paper items together at the MICR code-line level, and then matching the paper to the electronics.

The matching program produces the missing and extra report data files 1250, 1255. The initial release of ECP commingle matches on all five MICR fields. Future enhancements may allow the user to exclude the use of the process control ("PC") and auxiliary on-us fields during the match process. By using a stand-alone matching system that is unique to the commingle process, future system enhancements also allows the placement of more intelligent 'smart-matching' logic into the system to minimize the frequency of missing and extra items. [REFERENCE CRKR-0007].

From the above, it is apparent that the present invention provides, for use in a electronic presentment process wherein electronic items are transmitted from a presenting FI through intermediaries to payor FIs, a system for, and method of, clearing electronic items drawn on the payor FIs and received by the presenting FI for payment and a financial infrastructure employing the system or the method. The method includes the steps of: (1) sorting the electronic items into pockets corresponding to the intermediaries, electronic items destined for multiple of the payor FIs through a particular intermediary being commingled in a single pocket and (2) electronically transmitting the pockets from the presenting FI to the particular intermediary, the particular intermediary capable of further sorting the electronic items thereby to allow multi-staged sorting of the electronic items as the electronic items proceed through the electronic presentment process.

Although the present invention and its advantages have been described in detail, those skilled in the art should understand that they can make various changes, substitutions and alterations herein without departing from the spirit and scope of the invention in its broadest form.

What is claimed is:

1. For use in a electronic presentment process wherein electronic items are transmitted from a presenting financial institution (FI) through intermediaries to payor FIs, a method of clearing electronic items drawn on said payor FIs and received by said presenting FI for payment, said method comprising the steps of:
   sorting said electronic items into pockets corresponding to said intermediaries, electronic items destined for multiple of said payor FIs through a particular intermediary being commingled in a single pocket; and
   electronically transmitting said pockets from said presenting FI to said particular intermediary, said particular intermediary capable of further sorting said electronic items thereby to allow multi-staged sorting of said electronic items as said electronic items proceed through said electronic presentment process.

2. The method as recited in claim 1 wherein paper items accompany said electronic items through said electronic presentment process.

3. The method as recited in claim 1 further comprising the step of appending to said electronic items a return notification eligibility flag to indicate whether a particular item, information about which forms a part of presentment information, is eligible for a return notification, said appending step being carried out prior to said electronically transmitting step.

4. The method as recited in claim 3 wherein said eligibility flag comprises an indication that a particular item is not eligible for a return notification.

5. The method as recited in claim 3 wherein said eligibility flag comprises an indication that a particular electronic item requires at least one preliminary return notification and a final return notification.

6. The method as recited in claim 3 wherein said eligibility flag comprises an indication that a particular electronic item requires only a final return notification.

7. The method as recited in claim 1 further comprising the step of comparing records of an exceptions file with records of a receive control file containing said electronic items, said exceptions file capable of containing records subject to both ECP and non-ECP exceptions to thereby produce an electronic file of which of said electronic items are properly payable by a particular payor FI.

8. The method as recited in claim 7 further comprising the step of producing a control totals and unmatched exceptions report by said step of comparing.

9. The method as recited in claim 1 further comprising the step of providing an indication of stop payment suspect items to said presenting FI.

10. The method as recited in claim 1 further comprising the step of providing an issue exceptions report to said presenting FI.

11. For use in a electronic presentment process wherein electronic items are transmitted from a presenting financial institution (FI) through intermediaries to payor FIs, a system for clearing electronic items drawn on said payor FIs and received by said presenting FI for payment, said system comprising:

an electronic sorter that sorts said electronic items into pockets corresponding to said intermediaries, electronic items destined for multiple of said payor FIs through a particular intermediary being commingled in a single pocket; and data communication circuitry that electronically transmits said pockets from said presenting FI to said particular intermediary, said particular intermediary capable of further sorting said electronic items thereby to allow multi-staged sorting of said electronic items as said electronic items proceed through said electronic presentment process.

12. The system as recited in claim 11 wherein paper items accompany said electronic items through said electronic presentment process.

13. The system as recited in claim 11 further comprising the step of appending to said electronic items a return notification eligibility flag to indicate whether a particular item, information about which forms a part of presentment information, is eligible for a return notification, said appending step being carried out prior to said electronically transmitting step.

14. The system as recited in claim 13 wherein said eligibility flag comprises an indication that a particular item is not eligible for a return notification.

15. The system as recited in claim 13 wherein said eligibility flag comprises an indication that a particular electronic item requires at least one preliminary return notification and a final return notification.

16. The system as recited in claim 13 wherein said eligibility flag comprises an indication that a particular electronic item requires only a final return notification.

17. The system as recited in claim 11 further comprising the step of comparing records of an exceptions file with records of a receive control file containing said electronic items, said exceptions file capable of containing records subject to both ECP and non-ECP exceptions to thereby produce an electronic file of which of said electronic items are properly payable by a particular payor FI.

18. The system as recited in claim 17 further comprising the step of producing a control totals and unmatched exceptions report by said step of comparing.

19. The system as recited in claim 11 further comprising the step of providing an indication of stop payment suspect items to said presenting FI.

20. The system as recited in claim 11 further comprising the step of providing an issue exceptions report to said presenting FI.

21. A financial infrastructure, comprising:

a plurality of financial institutions (FIs) capable of receiving items and paying items;

a plurality of intermediaries interconnecting said plurality of FIs and capable of communicating items thereamong in a electronic presentment process wherein electronic items are transmitted from presenting FIs through said intermediaries to payor FIs; and a system for clearing electronic items drawn on said payor FIs and received by said presenting FIs for payment, including:

an electronic sorter, associated with at least some of said presenting FIs, that sort said electronic items into pockets corresponding to said plurality of intermediaries, electronic items destined for multiple of said payor FIs through a particular intermediary being commingled in a single pocket, and data communication circuitry, associated with at least some of said presenting FIs that electronically transmits said pockets from said presenting FIs to said plurality of intermediaries, said plurality of intermediaries capable of further sorting said electronic items thereby to allow multi-staged sorting of said electronic items as said electronic items proceed through said electronic presentment process.

22. The infrastructure as recited in claim 21 wherein paper items accompany said electronic items through said electronic presentment process.

23. The infrastructure as recited in claim 21 further comprising the step of appending to said electronic items a return notification eligibility flag to indicate whether a particular item, information about which forms a part of presentment information, is eligible for a return notification, said appending step being carried out prior to said electronically transmitting step.

24. The infrastructure as recited in claim 23 wherein said eligibility flag comprises an indication that a particular item is not eligible for a return notification.

25. The infrastructure as recited in claim 23 wherein said eligibility flag comprises an indication that a particular electronic item requires at least one preliminary return notification and a final return notification.

26. The infrastructure as recited in claim 23 wherein said eligibility flag comprises an indication that a particular electronic item requires only a final return notification.

27. The infrastructure as recited in claim 21 further comprising the step of comparing records of an exceptions file with records of a receive control file containing said electronic items, said exceptions file capable of containing records subject to both ECP and non-ECP exceptions to thereby produce an electronic file of which of said electronic items are properly payable by a particular payor FI.

28. The infrastructure as recited in claim 27 further comprising the step of producing a control totals and unmatched exceptions report by said step of comparing.

29. The infrastructure as recited in claim 21 further comprising the step of providing an indication of stop payment suspect items to said presenting FI.

30. The infrastructure as recited in claim 21 further comprising the step of providing an issue exceptions report to said presenting FI.

* * * * *